US005747719A

United States Patent [19]

Bottesch

[11] Patent Number: 5,747,719

[45] Date of Patent: May 5, 1998

[54] ARMED TERRORIST IMMOBILIZATION (ATI) SYSTEM

[76] Inventor: H. Werner Bottesch, RD#6, Box 374, Danville, Pa. 17821

[21] Appl. No.: 786,636

[22] Filed: Jan. 21, 1997

[51] Int. Cl.[6] .................... B64D 1/04

[52] U.S. Cl. .................... 89/1.1; 340/573; 340/547

[58] Field of Search .................... 89/1.11, 1.1; 340/573, 340/574, 541

[56] References Cited

U.S. PATENT DOCUMENTS

| | | | |
|---|---|---|---|
| 4,589,081 | 5/1986 | Massa et al. | 364/554 |
| 4,930,392 | 6/1990 | Wilson | 89/1.11 |
| 5,412,708 | 5/1995 | Katz | 348/14 |
| 5,600,303 | 2/1997 | Husseiny et al. | 340/568 |

*Primary Examiner*—J. Woodrow Eldred
*Attorney, Agent, or Firm*—Bernard A. Chiama

[57] ABSTRACT

A surveillance system is disclosed for preventing violence which may occur during attempts of armed robberies or acts of terrorism, thereby improving the security of persons within public buildings, governmental and industrial facilities. The system utilizes one or more optical imaging device (s) strategically located throughout the facility under surveillance, and in particular the entry ways therein for detecting potentially armed individuals or intruders entering or moving about the facility. The optical imaging devices operate in conjunction with a computor system having one or more databases containing information indicative of the presence of weapons and representing the types thereof which may be brandished by one or more persons entering the area under surveillance, and data indicative of the spectrum of human pre-aggressive movements, postures and gestures. The databases enable the system to differentiate between law enforcement personnel and their weapons from potential intruders and their weapons. The system includes immobilizing projectile firing devices, and is devised to tract the armed intruders, to target the intruders for possible immobilization, and to collect and maintain video evidence and other recordings of the results of such detection and tracing for possible legal evidenciary use.

19 Claims, 9 Drawing Sheets

FIG.8.c.
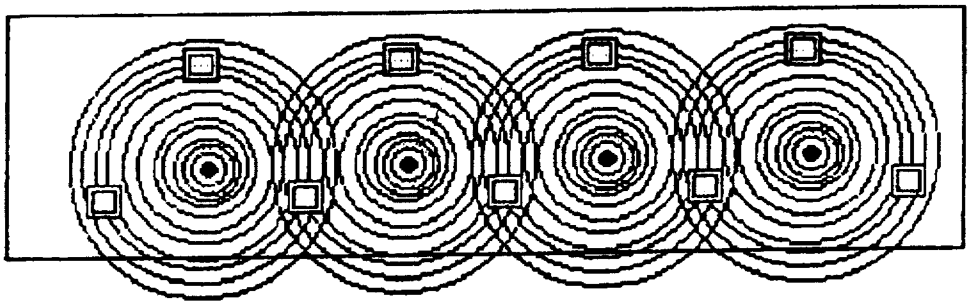
FIG.8.b.
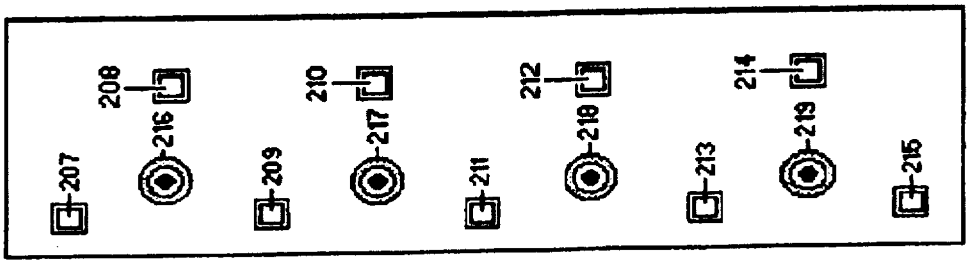
FIG.8.a.
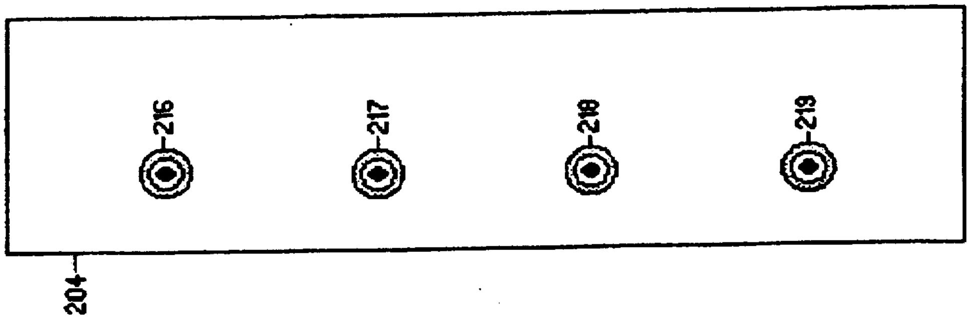
FIG.8
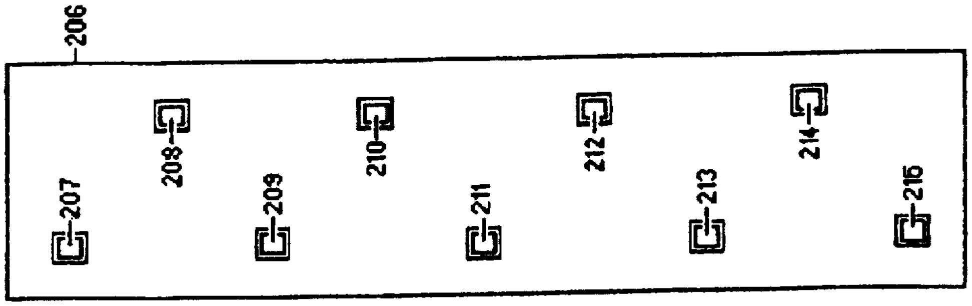

ARMED TERRORIST IMMOBILIZATION (ATI) SYSTEM

BACKGROUND OF THE INVENTION

This invention relates, in general, to computer-controlled, optically-based, security surveillance systems, and in particular, to a computer-controlled mediation between at least one video imaging means, at least one metallic object detection device, at least one human target acquisition means, at least one, human target discrimination means, at least one armed threat identification means, and at least one armed threat response mechanism associated therewith. The invention disclosed herein, offers society a relatively peaceful means for: preventing the violence occurring during acts of terrorism and armed robberies, improving the security of persons within public buildings endowed with this system, and, effecting the detention, apprehension, and hopefully, contributing to the prosecution of, persons committing such crimes. The invention also offers a means whereby nuclear, governmental, and industrial facilities can effectively augment, and automate their security coverage.

SUMMARY OF THE INVENTION

In principle, the ATI System is comprised of several sub-systems which, under the control of at least one computer, function together to detect, identify, track, and target for possible immobilization, potentially armed individuals who enter, and move within the confines of a facility which is protected by the system. The system's computer is interfaced with and utilizes inputs from a number of metal detector/discriminators, thermograph sensors, or other metal-sensing devices, which are stationed at, or in proximity to, the host facility entrances. These sensors allow the system's computer to detect the entry into the host facility, of weapons whether these are carried concealed on or openly brandished by persons entering the host facility. When potential weapons objects are detected entering the system's host facility, the computer effects the immediate optical electronic surveillance of, and the continuous, mechano-optical tracking of the person or persons, on whom the potential weapons objects were detected.

The system's computer is programmed to effect and control the continuous, active surveillance of such individuals. Such surveillance includes but is not limited to the optical tracking of such individuals, the analysis, frame-by-frame, of data representing the movements and postures of such individuals, the assigning of target coordinates to such individuals, and the updating of those target coordinates as those individuals move within the confines of the facility. The computer utilizes image targeting algorithms to assign and maintain target coordinates for the person or persons who are under active surveillance. The computer is programmed to perform high-speed analyses of the surveillance images of the targeted person, or persons, frame-by-frame. The computer is programmed to perform comparisons between data representing the anaylzed surveillance images and at least one database, comprised of data representing a variety of image models, which characterize the spectrum of human aggressive movements and postures, and which characterize the spectrum of hand-carried weapons presently known to mankind. During the course of these analyses, the computer compares the individual's image within each image frame to a database of image models representing potentially aggressive, or dangerous movements, and/or postures, which can be assumed by the human form.

During the system's active surveillance of targeted persons, the system's computer monitors the status of controls the target-tracking movements of, and the firing of, at least one, aggression-response mechanism, hereinafter referred to, as an "Armed Threat Response Mechanism", or "ATRM", in accordance with said assigned target coordinates. The ATI System computer's analyses of the surveilled person's movements are designed to: enable the computer to distinguish between normal human movements and postures and specific human movements and postures, which could precede the drawing of at least one weapon; to detect the appearance and movement of weapons elements during said image frame analyses; as well as to distinguish within each image frame, between targeted individuals and non-targeted individuals who may be in physical proximity to targeted individuals. Such analyses include the association of such movements and/or postures with the presence of at least one weapons image. If the computer's analyses and comparisons detect the onset of aggression coupled with the visual appearance of at least one weapons object, in the progressively analyzed, surveillance image frames of the targeted person, or persons, then the computer effects the firing of at least one immobilizing projectile by the system's armed threat response mechanism in accordance with said target coordinates at each of the targeted individuals.

Thus, if at least one potentially armed individual is detected entering the system's host facility is placed under the system's surveillance and attempts to draw a weapon, then the individual is immediately immobilized by the system, and is detained until capture. If such an immobilization becomes necessary, then the ATI System's computer is programmed to summon the authorities and, to effect the logging and preservation of the video record of the incident for use as prosecuting evidence. The computer monitors the immobilized person's bio-telemetry information when possible, and summons medical assistance if necessary. The ATI computer is also programmed to continually monitor the surveillance images of the immobilized individual for movements indicative of a renewed threat, or of flight to avoid capture and, is programmed to respond to the detection of such movements by re-immobilizing that person via the firing of at least one additional, immobilizing projectile in order to prevent that person's escape.

It is an objective of the present invention to permanently reduce the numbers of armed robberies and acts of violence occurring daily in public facilities, and to further the protection of human life under such circumstances. Another objective of the present invention is to effect the documentation, immobilization, and capture of terrorists, and violent, armed criminals, during the performance of their acts of armed aggression but prior to the consummation of such acts and, to provide credible evidence to be used in their prosecution. Another objective of the present invention is to provide government with a fully automated system for protecting its embassies, courthouses, airports, restricted facilities, etc., from armed intrusions and/or terrorist assaults. The ATI System may also have application in the military's soft war program, and may be used in law enforcement, for automated riot control and, as an enhancement for remotely controlled vehicles which are employed in, e.g., hostage situations, sieges, etc. It is felt that the widespread deployment and use by society of any of such system configurations, would have significant impact in reducing crimes involving the misuse of weaponry and, would ultimately lead to the decimation of society's violent criminal population.

BRIEF DESCRIPTION OF THE DRAWINGS

FIG. 1*a*. illustrates an enhancement of the configuration of the ATI System peripheral group of FIG. 1, to which a secondary, Armed Threat Response Mechanism has been added.

FIG. 2*a*. illustrates the immobilizing projectile of FIG. 2, in its pre-fired state.

FIG. 2*b*. illustrates the immobilizing projectile of FIG. 2*a*., in flight, en route to its intended target.

FIG. 2*c*. illustrates the immobilizing projectile of FIG. 2*b*., showing the method of release of the projectile's barb.

FIG. 2*d*. illustrates one of a number of possible launching tube and projectile wiring configurations of the present invention.

FIG. 4*a*. illustrates the frontal portion of the Armed Threat Response Mechanism of FIGS. 1, 1*a*., 3 and 4.

FIG. 5*a*. illustrates the immobilizing projectile of FIG. 5 in its pre-fired state.

FIG. 5*b*. illustrates the immobilizing projectile of FIG. 5*a*. in flight, en route to its intended target.

FIG. 5*c*. illustrates the immobilizing projectile of FIG. 5 showing the method of release of the projectile's barb.

FIG. 5*d*. illustrates another variation of the launching tube, projectile, and wiring configurations of the present invention.

FIG. 5*e*. illustrates an alternate propulsion means for the immobilizing projectile of FIG. 5.

FIG. 5*f*. illustrates a launching tube configuration for firing the projectile of FIG. 5*e*.

FIG. 7*a*. illustrates an example of a commercially available Transponder Signal Transmitting and Receiving device for use in the present invention.

FIG. 7*b*. illustrates an example of a commercially available, radio signal transponder device for use in the present invention.

FIG. 8 illustrates a transparent view of the magnetic sensor housing 206 as would be viewed when facing left, in FIG. 7.

FIG. 8*a*. illustrates a transparent view of the electromagnet housing 204 of FIG. 7 as would be viewed from within a host facility doorway.

FIG. 8*b*. illustrates a transparent view of the metal object detection components of FIGS. 8–8*a*., which are superimposed upon one-another, in accordance with their usage in FIG. 7.

FIG. 8*c*. illustrates a transparent view of the components of FIG. 8*b*., showing possible, electromagnetic radiation patterns, emitted by the electromagnets 216–219 in realtion to the magnetic sensors 207–215.

DESCRIPTION OF THE PREFERRED EMBODIMENTS

A computerized system is disclosed for use in nuclear, governmental, industrial, and commercial host facilities, which combines the automation of video surveillance with the automation of physical security responses, thereby effecting automated, instantaneous interventions in acts of violence, which involve human misuse of weapons during acts of terrorism, armed robbery, armed violence, and, under predefined circumstances, in crimes against property.

Figure 4:
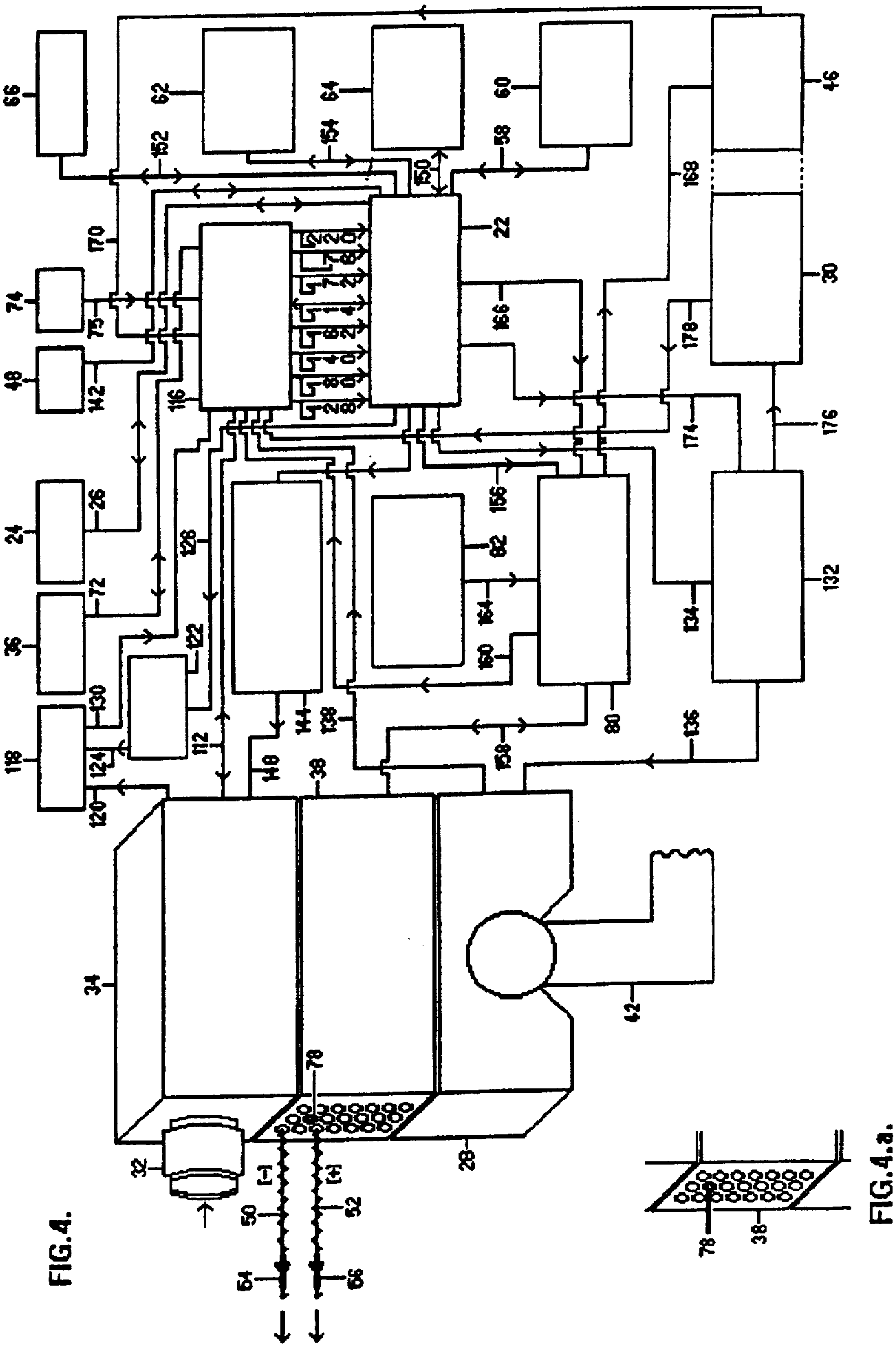
FIG. 4 illustrates a flow chart of the ATI System in accordance with a preferred embodiment of the present invention.

The following disclosure details the description, functioning, and operation of at least one of the preferred embodiments of an automated, computerized, optical surveillance and criminal immobilization system, herein referred to as the Armed Terrorist Immobilization System or ATI System At the core of the ATI System is at least one computer 22 of FIG. 4, which is programmed to perform a variety of functions such as, to coordinate its control of, monitor, and respond to, the various inputs from the system's peripherals. The ATI System's computer 22 accesses at least one main operating program 24 FIG. 4, via conductors 26 enabling the computer to coordinate its control over the ATI System. Computer 22 is configured and programmed to perform multiple tasks with regard to coordinating the operation of the system's servo devices 28 and 30 in relation to the video image acquisition devices (Surveillance Imaging Means, or SIM units 34) and the video image enhancement devices, which operate the zoom, and image-focusing features of the lens mechanism 32 for each, modularized set of peripherals in the system. In addition to coordinating the operation of the various mechanical devices, computer 22 is also programmed to correlate and to utilize the information which is derived consequent to its operation of these mechanical devices.

Figure 7:
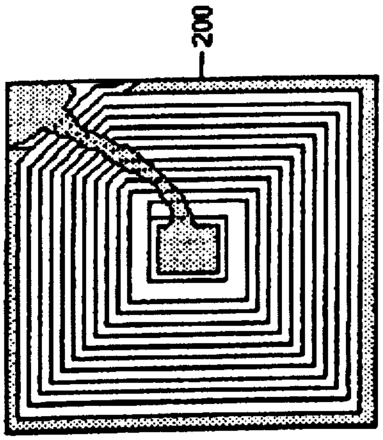
FIG. 7 illustrates a possible configuration of the system's Metal Object Detection/Discrimination sensor units in a transparent view, which is taken from the exterior of a host facility doorway.
Figure 7:
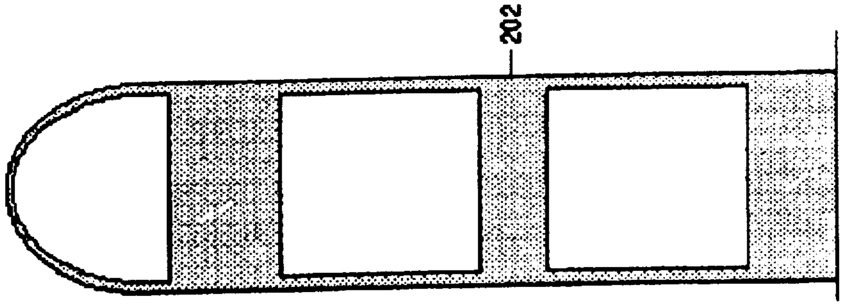
Figure 7:
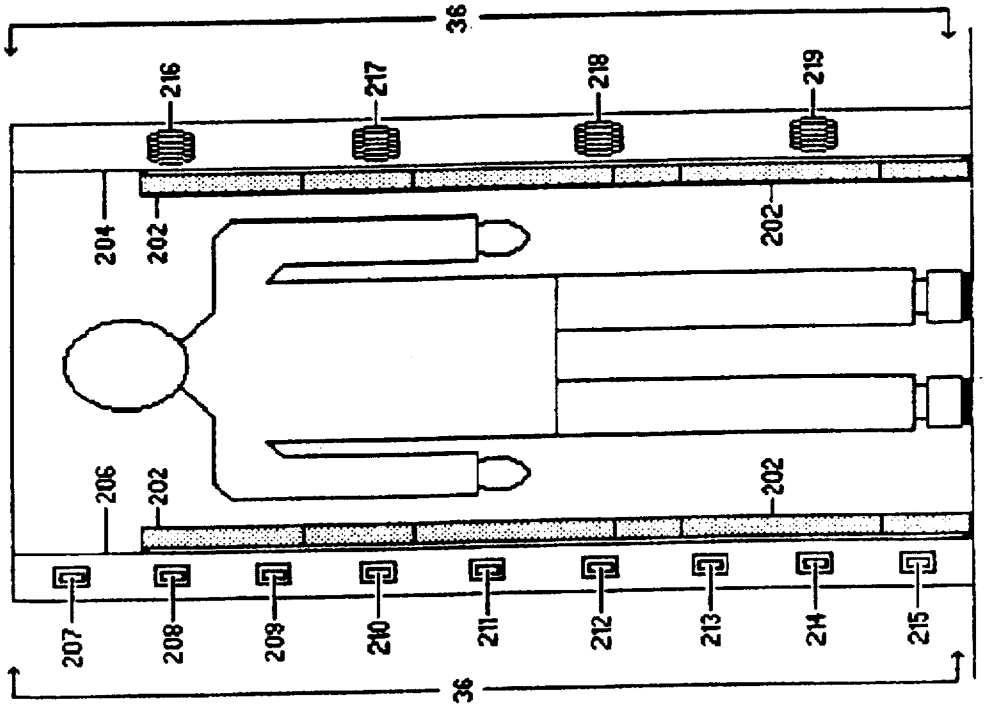
Figure 9:
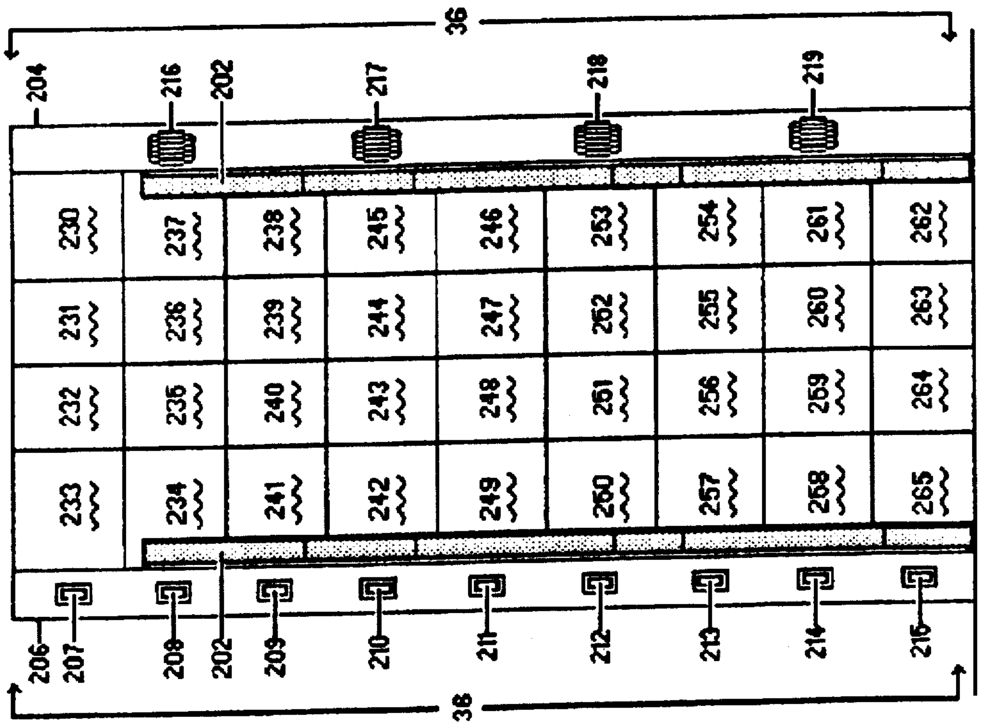
FIG. 9 illustrates the Metal Object Detection/Discrimination sensor unit of FIG. 7, which shows its area of metal detection subdivided into grids.

One of the ATI system's peripheral component groups is comprised of multiples of the Metal Object Detection and Discrimination sensors (or MOD sensor units) 36 FIGS. 4 and 7, each of which is deployed to provide independent) metal detection coverage for each of the various entrances of the system's host facility. Such metal object detection and discrimination units may use, but are not limited to using, magnetic-based detection technologies, heat thermography technology, or other technologies adaptable to that purpose. In the present embodiment, magnetic-based, metal-detection technology is used. The Metal Object Detection and Discrimination sensors of MOD sensor units 36 of FIGS. 4 and 7, combine the use of magnetic-based, metal detection technology, with anti-shoplifting, transponder technology, such as the Checkpoint QS-2000 System, parts of which are illustrated in FIGS. **7–7*b*., Checkpoint's system is currently in use by some corporate entities within the Retailing Industry. The inputs from both of these types of sensor devices are digitized and fed into the system's computer 22** for interpretation.

The computer 22 is programmed to monitor the inputs from the metal-detecting, magnetic flux gate sensors 207–215 of FIGS. 7 and 8, individually, and continuously, for the presence of metallic objects of significant size which may be concealed on, or openly carried by persons entering the system's host facility. The use of the inputs from the Transponder Signal Transmitter/Receiver component 202 FIGS. 7–7*a*., of each of the MOD Sensor units 36 will be discussed later. The information which is fed into the computer by the metal-detection components 207–215 of these sensors 36 is specific with regard to the mass and the dimensions of the detected metallic object as well as its location on the body of the person entering the host facility. It is desirable that such sensor information be precise enough to enable computer 22 to discriminate between the detection of a potential weapon, and, e.g., a large key ring or roll of coins, although such refinement need not be critical with regard to the overall functioning of the system. The continuous surveillance of each of the entrances and exits by at least one MOD Sensor unit 36 enables the system's computer to filter out all potentially armed individuals entering the host facility, and place them under active surveillance. Such sensors should themselves be concealed or made otherwise inconspicuous.

The computer 22 is programmed to monitor each of the MOD sensor units 36 oil an individual basis with regard to each unit's individual, metal-detecting, sensors 207–215 thereby enabling it to determine a specific entrance location for each detected metal object. The computer 22 is programmed to utilize this information to initiate the optical surveillance and tracking of each person on whom the metal object was initially detected and, to target such persons for potential immobilization. The individual MOD sensor unfits 36 which are located at each of the host facility entrances and exits, each have the capability of providing data, which computer 22 uses to determine the lateral direction of movement of detected metal objects in order to enable computer 22 to confirm the entry, and exit movements of these detected metal objects.

Figure 1:
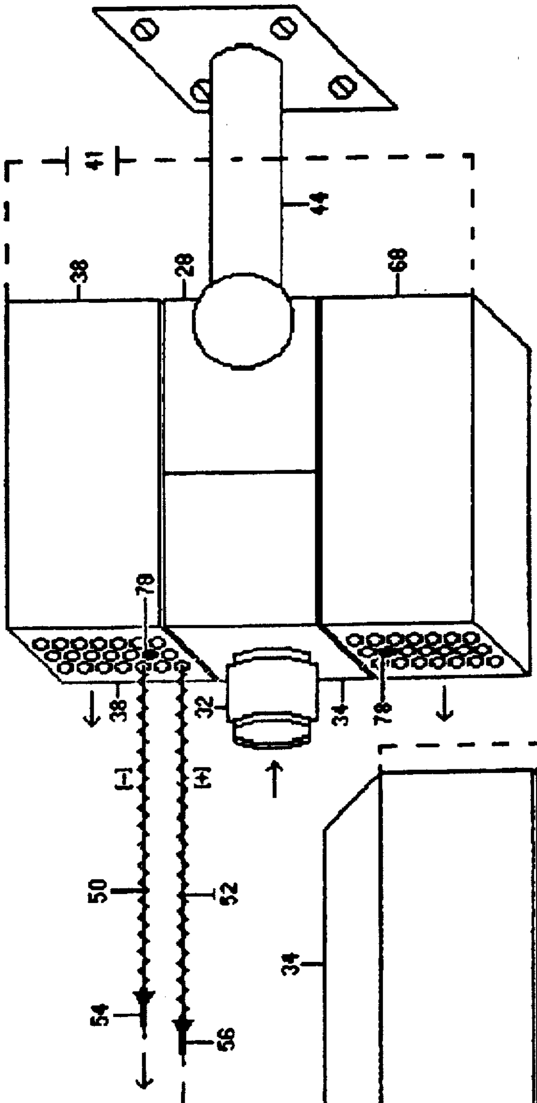
FIG. 1 illustrates one of a number of possible configurations of an ATI System peripheral group, comprising surveillance imaging means, surveillance servo mechanism, Armed Threat Response Mechanism, and a wall-mounted, bracket arm.
Figure 1:
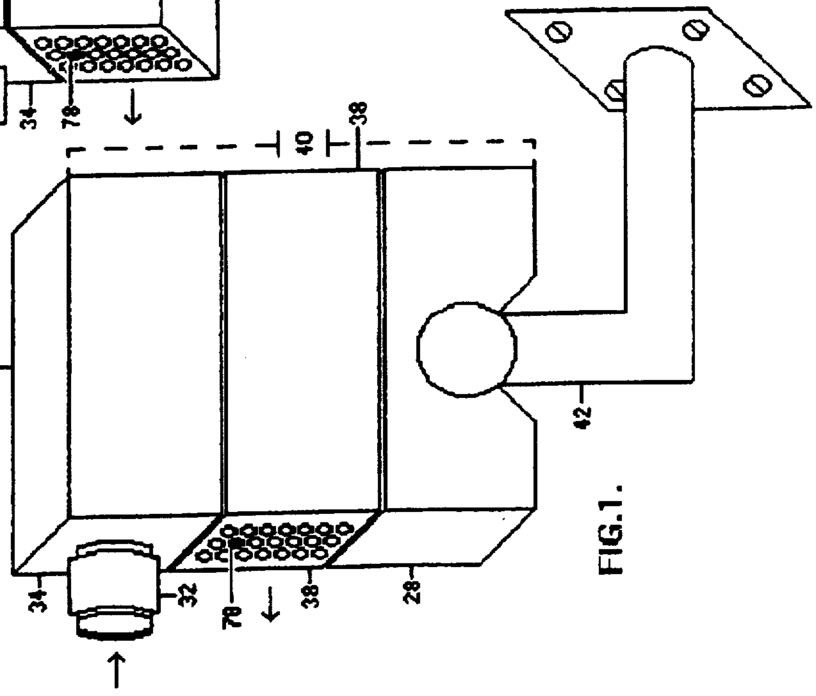

Another of the ATI System's peripheral groups is comprised of a number of video imaging devices, each of which is connected to, and individually operated by at least one computer 22 and, each of which, is capable of producing video images of surveilled persons, and inputting such images into the computer for analysis. Each of these independently operated, video imaging devices is herein referred to as a Surveillance Imaging Means or SIM unit 34 and, is illustrated in FIGS. 1, 1*a* and 4. The ATI System is configured and programmed to utilize the surveillance image inputs from at least one SIM unit 34 in providing surveillance images for use by at least one system computer 22. The physical configuration of the SIM unit 34 which is shown in FIGS. 1, 1*a* and 4 is modular, and is designed to attach to at least one Armed Threat Response Mechanism or ATRM unit 38 which is also of modular configuration.

The third component of this modular group of peripherals is comprised of at least one precision motion control Servo device 28 which controls the simultaneous movement of its attached SIM unit 34 and the aiming of its attached ATRM unit 38. The Servo 28 is operated in conjunction with a fully articulating, wall-mounted, bracket arm 42 the mechanical details of which are not illustrated herein. The purpose of such an arrangement is to enables each SIM unit to have a full range of motion, for use during its active, optical surveillance of potentially armed persons, who have entered the system's host facility. A Servo mechanism 28 is attached to a fully articulating wall, or ceiling-mounted, bracket arm 42 and 44 of FIGS. 1 and 1*a*., respectively. Each such group of modular components comprises the Modular Surveillance Unit, or MSU 40 of FIGS. 1 and 4, and a MSU 41 of FIG. 1*a*. Although such individually-controlled, peripheral devices have been configured to fit into common, module-receptive, MSU housings 40 or 41, it should be understood that such components can be independently mounted in a variety of locations. It should also be understood that the mechanical movements of such separate components are separately controlled by at least one computer via the use of individually dedicated, servo mechanisms. The physical separation of such components also adds to their concealability and effectiveness within the host facility. For example, the Surveillance Imaging Means 34 can be mounted with its own Servo unit 28 in one location while another, remote, ATRM unit 46 FIG. 4, along with its own dedicated servo unit Servo 30 can be mounted in an entirely different location. FIG. 1*a*. illustrates the tandem firing of two immobilizing projectiles 54 and 56 from the launching tubes 1 and 7 of an inverted ATRM unit 38 of FIGS. 1 and 3. At least one SIM unit 34 is dedicated to optically monitor each of the host facility's entrances and/or exits.

During periods of inactive surveillance, the system's computer 22 is programmed to aim each of the Surveillance Imaging Means or SIM unit 34 in the proximity of a specific, host facility entrance, and to passively monitor all persons entering and exiting the facility at that entrance. If one of the metal object detection sensors of one of the MOD sensor units 36 detects a metal object being brought into the host facility, the computer is programmed to immediately initiate its analyses of inputs from the most proximate, Surveillance Imaging Means 34 and to immediately initiate the optical tracking and targeting, of the person on whom the metal object was detected. The computer is programmed to assign target coordinates to that person, via its Target Acquisition Means 48 FIG. 4. The computer is further programmed to effect the targeting of specific sites on the body of a targeted individual based on the availability of those sites, as targets as determined by its analyses of the surveillance images of the targeted individual. Additionally, the computer 22 is programmed to select a preferred target site on the image of the body of each targeted person within each image frame being analyzed. This will increase the probability that the system will obtain quality bio-telemetry data following each immobilization of a targeted individual.

After a targeted individual has been immobilized, the ATI system may remain in electrical contact with the skin of the immobilized individual, via conductors 50 and 52; FIGS. 1*a*. and 2–2*d*., which are attached to the electrically conductive, projectiles 54 and 56, respectively. If such contact is maintained, the computer 22 is programmed to monitor for, and to interpret the electrical signals obtained from the immobilized individual. Such bio-telemetry information includes but is not limited to, data pertaining to the individual's cardiac rhythm, rates of cardiac contraction, etc. The computer is programmed to interpret such cardiac data in a manner which will enable it to identify life-threatening arrhythmias, such as ventricular fibrillation, or other conditions, which may require timely medical assistance. If such bio-telemetry data indicates that the immobilized individual is in such danger, then computer 22 is programmed to effect the summoning of medical assistance, in addition to its summoning of the authorities by, e.g. telephone, via conductor 58, utilizing modem 60. The computer may be programmed not to discharge a secondary pair of projectiles, if life-threatening arrhythmias are detected. Computer 22 is programmed to function unimpeded in the absence of post-immobilization, bio-telemetry data, in the event that it's connections with conductors 50 and 52 are disrupted or, if direct skin contact with the projectiles 54 and 56 is not established.

The system's database 62 FIG. 4 is comprised of data representing a variety of image models, which are used by the system's computer 22 as bases for various analyses, and comparisons, with surveillance image data, which are actively input, from at least one, Surveillance Imaging Means 34 during the system's active surveillance of, and mechano-optical tracking of, at least one, armed, or potentially armed person. A database of such image models may be compiled using methods, such as those which are used in the wire-frame modeling of human movement, and posturing in, for example, sports-related, human movement analyses or, in computerized animation. The movements, postures, and gestures, of which such image models are comprised, are those which have the potential of being associated with acts of armed aggression. Such modeled and compiled movements, postures, and gestures, anticipate the drawing of a weapon, but the detection of such movements, postures, and gestures, by the computer during its surveillance image analyses, is not interpreted by the computer as representing the onset of such all event until it detects a weapon image in association therewith. For example: the image models of a hand reaching under a coat lapel, or into a pocket, would fall into this category. Such movements in and of themselves. don't necessarily represent a danger however, they do have the potential to culminate in the drawing of a weapon, and therefore are modeled and compiled for use by the computer. Such movements can be said to be pre-aggressive, although they don't necessarily represent aggression, per se. The same reasoning is applied to the image modeling of human postures and gestures in association with the image modeling of such movements. When the computer detects the onset of such pre-aggressive, human movements, postures, and gestures, it is programmed to conduct further analyses of the subsequent surveillance images for the appearance within each surveillance image of a generic, hand-held object The computer is programmed to analyze the images, of such generic, hand-held objects, by comparing their data to the data representing a variety of weapons image models, which are stored in, and accessed from, database 62. The computer's detection of the presence of a generic, hand-held object and, the computer's identification of that object as a weapon, in association with such pre-aggressive movements, postures and/or gestures, comprises its detection of an armed threat.

Some of the image models data, comprising database 62 also represent image models, which define the spectrum of pre-aggressive, post-immobilization, human movements, postures, and gestures, which can occur during and after the immobilization of the human form. This also includes image models, which are associated with at least one, generic, hand-held object. In the system's post-immobilization phase of operation, the computer is programmed to analyze the images of such generic, hand-held objects, by comparing their data to the data representing a variety of weapon image models, which are stored in, and accessed from, database 62. The computer's detection of the presence of a generic, hand-held object in at least one post-immobilization surveillance image frame and, the computer's identification of that object as a weapon, in association with such pre-aggressive, post-immobilization, movements, postures and/or gestures, comprises its detection of a renewed, armed threat.

The human image models, comprising the above-cited image models data, are multi-dimensional, with regard to the perspectives from which they can be viewed and analyzed. This also applies to the weapons image portion, of the data comprising the database 62. The inclusion of a variety of human movement image models, which have at least one, hand held generic object, as an attribute, in database 62, is useful, in the process whereby the computer 22 determines whether or not, an object is being held in a surveilled person's hand(s), at the onset of surveillance or, whether or not, an object is being drawn from concealment by a surveilled person during the later stages of surveillance.

The system's computer 22 is programmed to utilize the different aspects of database 62 in relation to the various comparisons and analyses, which it is programmed to perform, on the active surveillance image data being input from at least one SIM unit 34. The system's computer 22 is programmed to access and utilize the Video Image Analyzing Means 64 during the system's active surveillance of each targeted individual. The Video Image Analyzing Means, 64 is comprised of algorithms, which are specifically written to enable the computer to analyze the content of each video image with respect to the isolation of the image of at least one, targeted individual, from the images of any non-targeted individuals, and/or inanimate objects, which may be present within each of the video image frames, which are input from each SIM unit 34.

The computer is programmed to sequentially compare the targeted individual's image data within each image frame to the data in the pre-compiled database 62. The human image models, portion of database 62 is comprised data representing a variety of modeled, human images, which encompass the range of potentially hostile movements and postures, assumable by the human form. The weapons image models portion of database 62 is comprised of image models data, which represent the modeled images of the many, individual, small arms comprising the spectrum of small arms, as known to mankind. Each successive image frame captures a sequential increment of the movement of each targeted individual. The above-cited data comparisons are performed by computer 22 sequentially, image-by-image and frame-by-frame. Computer 22 utilizes the Artificial Intelligence and/or Fuzzy Logic algorithms 66 in comparing the targeted individual's image data (which is derived from the current surveillance image frame), with the human image models data, and weapons image models data, comprising database 62. During such comparisons, the computer 22 uses Artificial Intelligence and/or Fuzzy Logic algorithms 66 in attempting to match or approximately match the movements, postures, and/or, objects of the image frame being analyzed with similar or identical movements, postures, and/or, objects, which have been modeled, compiled, and stored in database 62. The outcomes of these frame-by-frame analyses of the incremental movements, of targeted individuals are utilized by computer 22 to identify and respond to the onset of potentially hostile movements and postures and, the incremental appearance of at least one weapon image in association with each targeted individual's image.

The Video Image Analyzing Means 64 is comprised of algorithms, which will enable the computer to discriminate between the image of at least one targeted individual, and other, irrelevant images which may be present within the image frame being analyzed. Such irrelevant images are to include the images of inanimate objects as well as non-targeted individuals who might stray into the area of surveillance in proximity to the targeted individual. The computer is programmed to identify and monitor the positions and movements of such non-targeted individuals and objects within the context of their appearance in each image frame being analyzed. The computer performs this function in conjunction with its tracking and targeting of the primary subject(s) of the system's active surveillance.

The tracking and targeting of surveilled persons can be accomplished in a number of ways. For example, the computer can be programmed to individually outline and mark for identification the individual images of targeted and, non-targeted persons and objects within each surveillance image frame. The computer is programmed to track the movements of such non-targeted persons and objects, in relation to each other and in relation to the movements of targeted persons within the context of each image frame and, from each, current image frame to the next. The computer can accomplish the tracking of the images of persons and objects from one image frame to the next, by outlining each person and object in the current and, in each subsequent image frame. The computer then assigns each person and object its own, specific color tint, and transparently fills each outlined area with its assigned color tint. The programming for these operations is stored in and accessed from the Target Acquisition Means 48 FIG. 4, by computer 22. The computer uses such coloration to isolate the image of each targeted person from the images, of all other, non-targeted persons and objects in each current surveillance image frame. The computer assigns the same colors to their respective persons and objects in subsequent image frames. The computer then compares the individual images within the most recent image frame to the individual images in the previous image frame in order to determine and assess the progressive movements and positional relationships of each non-targeted person, and object, to the progressive movements and position of each targeted person. This enables computer 22 to distinguish between the images of at least one, targeted person, and the images of non-targeted persons and objects, which may come in proximity to the targeted person within any given image frame.

The computer is programmed to identify and analyze the progressive obscurement of at least one targeted person by one or more non-targeted persons and/or objects as it analyzes each, subsequent image frame. If the image of a targeted person is totally obscured by one or more non-targeted persons or objects then, the computer is programmed to accurately re-acquire and re-target the image of that targeted person after the obscurement has resolved. The computer can accomplish this using the following method. The computer 22 is programmed to retain the data pertaining to the shape of the targeted person's outline, and uses it as the basis for comparison with the targeted person's re-emerging outline as the obscurement incrementally resolves. The computer is programmed to: retain the assigned color tint of the targeted person after obscurement has occurred, track the obscuring image in each, subsequent image frame and, to re-tint and re-target the obscured image as it incrementally re-emerges from behind the obscuring image. If the image of one or more non-targeted persons or objects partially obscures the image of a targeted person, the computer is programmed to flexibly recalculate and reassign at least one, new set of target coordinates to an unobscured portion of the targeted person's image. The computer is programmed to re-affix the targeted person's target coordinates onto an unobscured area of the targeted person's body, and to actively re-aim its ATRM peripherals, in accordance with said recalculated target coordinates.

In an example of an alternate method for re-acquiring a totally obscured, targeted person, the computer is programmed to effect the active surveillance of all persons involved in the obscurement until the metallic object is re-detected by one of a number of interiorly stationed, MOD sensor units 36. When this occurs, the computer cancels its surveillance of the other person, or persons, involved in said obscurement. Until then, all such persons are tracked and targeted by the system for possible immobilization. As before, the computer is programmed to analyze the data representing each targeted person's image, within each image frame, with regard to each person's movements and postures within that image frame and, incrementally, from one frame, to the next. The computer is programmed to compare the data, representing these incremental movements, to the data in database 62, using the Artificial Intelligence and/or Fuzzy Logic algorithms 66. During such comparisons, the computer 22 uses Artificial Intelligence and/or Fuzzy Logic algorithms 66 in attempting to match, or approximately match the movements, postures, and/or, objects, of the image frame being analyzed with similar or identical movements, postures, and/or, objects, which have been modeled, compiled, and stored in database 62.

Whenever one of the system's MOD sensor units 36 detects the entry of at least one metal object, of significant mass and dimensions into the host facility, computer 22 is programmed to effect the immediate optical surveillance and tracking of, and the assignment of target coordinates to, each person on whom, such a metal object is detected. Under such circumstances, each of the SIM units 34 which is proximate to the person's point of entry, is engaged in such tracking and, each of the proximate ATRM units is aimed, in accordance with each surveilled person's assigned target coordinates.

Computer 22 is programmed to compare each person's initial surveillance image data, which are produced at the onset of surveillance and, which are input from at least one SIM unit 34, to the human image models data, which are stored in database 62. The reason for this comparison is to first determine, whether or not, each surveilled person entering the host facility is openly carrying a hand-held, generic, object. Such a determination can then be used by computer 22 to effect further more intense analyses of the surveilled person's image, for the purpose of determining whether or not, a hand-carried object is, or is not, a weapon. This determination process may begin with the computer's analyses of that person's arm and hand positioning, both in relation to the positioning of the hands relative to that person's image as a whole and, in relation to whether or not, one or more objects are being held in either, or both hands. The computer is programmed to then intensely analyze the data representing each enlarged image with regard to the surveilled person's hands. Such analyses involve those portions of the surveillance images, which pertain to hand contents, and, hand and arm movements, and positioning.

Computer 22 is programmed to compare the data, representing the image of any hand-held generic object(s), to the image models, in database 62, which pertain specifically to weaponry. The computer is programmed to detect, incrementally, the visual presence of any object being held in at least one hand, and is programmed to discriminate between harmless objects, and weapons objects which are drawn from concealment. A database comprised of weapons objects image models, as viewed from various perspectives, is used by the computer as a reference for comparison with the drawn object. The computer is programmed to compare the data representing the images of such objects, drawn from concealment, to a database comprised of data representing the modeled images of known weapons objects. In such comparisons, the computer 22 uses Artificial Intelligence and/or Fuzzy Logic algorithms 66 in attempting to match, or to approximately match, the weapons object image undergoing analysis, to at least one of the weapons objects image models stored in database 62. As each successive image frame is so analyzed, the graduated appearance of a weapons image within the surveillance image can be incrementally detected by computer 22 from one frame to the next. These analyses and comparisons enable computer 22 to determine whether or not, at least one, hand-held object, as it is being drawn from concealment, is, or is not a weapon, e.g. a firearm. The outcome of this determination, in turn, enables computer 22 to determine whether or not, the surveilled person should be immediately immobilized by the system via the discharging of at least one, immobilizing projectile from at least one ATRM unit. Therefore, if a surveilled person is engaged in the drawing of an object from concealment, and the system positively and incrementally identifies that object as a weapon then, that person is immediately immobilized. The speed of such an immobilization is dependent upon the speed with which computer 22 analyzes successive surveillance image frames and, upon the speed of the fired projectile(s). The speed of such analyses should be sufficient to enable computer 22 to effect the interruption of any act involving the drawing of a weapon from concealment, prior to the consummation of that act.

In relation to the above-cited image analyses, computer 22 is also programmed to utilize the data being input from at least one of the metal object detection sensors of one of the system's MOD sensor units 36. FIG. 4, relative to the location of at least one, detected metal object on the body of the person under surveillance. This represents a refinement in the computer's reliability in determining whether the detected metal object is hand-carried, or is carried concealed. The computer 22 is programmed to compare these two sets of analytical data for the purpose of enabling it to determine whether or not, the location of the object detected by the MOD sensor unit 36 matches, or approximately matches, the location of the hand-held object as obtained via the analysis of the optical image data. Computer 22 is programmed to access and utilize Artificial Intelligence, and/or Fuzzy Logic programming 66 in making the aforementioned comparisons. Thus, the computer can determine whether or not the hand-held, openly carried, optically detected object is the same metal object, which was detected by MOD sensor unit 36 and can then determine if that hand-held metal object is, or is not, a weapon. If the computer 22 determines the hand-held object to be a weapon then, the computer is programmed to effect the immediate discharging of the Armed Threat Response Mechanism ATRM 38 onto the assigned target coordinates, thereby immobilizing the armed person. Such an immobilization will occur when the armed person is still in close proximity to the facility entrance.

If computer 22, by virtue of its programming its image data analyses and its image data comparisons, determines that the surveilled person is carrying a generic, hand-held object, then, it effects an optical zooming in, and focusing, onto the upper torso of that person, via the zoom and focus lens features of the lens mechanism 32 of the SIM unit 34 of FIGS. 1, 1*a*. and 4, thereby producing enlarged images for analysis. The computer is programmed to then, intensely analyze the data representing each enlarged image with regard to the surveilled person's hand and arm positions, and with regard to the presence of a generic object in either or both hands. Computer 22 is programmed to compare the data representing the perspective-relevant image of a detected, hand-carried, generic object(s), to the perspective-relevant image models, stored in, and accessed from, at least one database 62, pertaining specifically to weaponry. These analyses and comparisons enable computer 22 to determine whether or not, the detected, hand-carried object is, or is not a weapon, e.g. a firearm. The outcome of this comparison, in turn, determines whether the surveilled person will be immediately immobilized by the system, or whether that person will be placed under active surveillance while in the confines of the host facility. If the surveilled person is openly brandishing a weapon, the computer 22 is programmed to effect the immediate immobilization of that person in proximity to that person's point of entry into the host facility.

If computer 22, by virtue of its programming, its image data analyses, and its image data comparisons, determines that a surveilled person is not carrying a generic, hand-held object then, it effects the continuous, active, optical surveillance of, mechano-optical tracking of, and computerized targeting of that person under the assumption that the person may be carrying a concealed weapon. The mechanical aspect of such surveillance is performed via the computer's control of various servo motors, which are attached to some of the system's peripheral devices and, is perofrmed in relation to the analyzed surveillance images of at least one, targeted individual. These peripheral devices include at least one SIM unit 34, at least one MOD sensor unit 36, and at least one Armed Threat Response Mechanism or ATRM unit. In conjunction with such tracking and targeting, the computer 22 is programmed to conduct high speed, image analyses of that person's surveillance images as these are being input from each of those SIM units 34 which are actively engaged in surveilling that person. The system's computer is programmed to analyze such incoming surveillance images individually, and on a frame-by-frame basis with regard to the surveilled person's hand and arm positioning and movement, in relation to posturing, gesturing, and body movement as well as with regard to the graduated appearance of weapons elements within the images undergoing such analyses. The computer is programmed to effect the zooming and focusing, of at least one SIM unit 34 onto the torso area of at least one targeted individual, when it incrementally detects the onset of pre-aggressive movements, postures, and/or gestures, via the SIM unit's zoom and focus lens features at lens mechanism 32, FIGS. 1, 1*a*. and 4, thereby producing enlarged images, which provide finer image details for analysis. Once such movements are detected, the computer is programmed to intensify its analysis of the torso portion of said image, specifically with regard to those image portions representing the targeted individual's arms and hands. Under such intensified analysis, the computer is programmed to analyze the images of the targeted individual's hand(s) for the appearance of at least one, generic object, as that hand emerges from concealment. The purpose for such analyses is to enable computer 22 to detect and identify the incremental appearance of the image of at least one weapon in the image frames being analyzed. If computer 22 determines that the object being drawn is a weapon, the computer effects the immediate firing of at least one immobilizing projectile from the Armed Threat Response Mechanism 38 onto that person's assigned target coordinates, thereby effecting the immediate immobilization of that person. The computer 22 is programmed to effect verbal communication with both hostile and non-hostile parties after an immobilization has occurred. Such verbal communications could include "PLEASE CLEAR THE AREA THE POLICE HAVE BEEN CALLED.", "DO NOT MOVE, OR YOU WILL BE STUNNED AGAIN!", etc.

The expression of the foregoing parameters in algorithm form and their use by the system's computer 22 enables the computer to accurately and incrementally analyze the images of at least one targeted individual for the development and presence of pre-aggressive movements, postures, and/or gestures, as well as for the incremental appearance of at least one weapon, as it is being drawn from concealment by at least one, targeted individual. Once computer 22 is programmed to operate in accordance with the above-cited parameters, it may then be programmed to accurately respond to any act of armed aggression, via the system's Armed Threat Response Mechanisms, ATRM's 38, and 68 of FIGS. 1, 1*a*, and 3, ATRM's 38 and 46, of FIG. 4, and/or, ATRM 70 of FIG. 6. Thus, if the ATI System's computer 22 positively identifies a targeted individual's attempted execution of an armed threat, as previously defined herein, it is programmed to respond, by effecting the firing of at least one Armed Threat Response Mechanism, onto the surveilled person's target coordinates, resulting in the immediate immobilization of the surveilled, targeted individual.

If a group of potentially armed persons enters the host facility and fragments upon entry, computer 22 is programmed to track and target each member of the group as an individual or as a member of a sub-group. The computer 22 is programmed to track, engage and immobilize multiple targets, as well as individual ones. Computer 22 is programmed to sequentially utilize each of its SIM units 34 in the optical tracking, and targeting of each of these persons as they move within the confines of the host facility. The aiming of the system's various ATRM units is in accordance with each person's individualized target coordinates. The computer uses such target coordinates to aim the most proximate SIM units 34 ATRM units 38 and remote ATRM units 46 at each such person as such persons move within the confines of the host facility. During group engagements, the computer is programmed to average the target coordinates of the individuals in the group for the purpose of aiming the ATRM units in anticipation of multiple firings. If multiple targets are engaged, they are fired upon in sequence in the order in which their target coordinates were assigned and, in the order in which, the appearance of weapons images occurs.

Once targeted persons have been immobilized, the computer 22 is programmed to monitor the surveillance images of each immobilized person for movements indicative of a renewed, armed threat, as previously defined herein or, for movements indicative of flight to avoid capture. The computer is programmed to respond to the detection of such movements by re-immobilizing each person via the firing of at least one additional, immobilizing projectile, in order to prevent that person's escape. The computer determines that such a person is immobilized by comparing the data representing the image of the immobilized person with regard to the positioning of the torso and extremities relative to a horizontal plane, to a database comprised of image models of such positioning stored as part of, and accessed from, database 62, FIG. 4. This includes the analysis of the surveillance images for weapons content, particularly in relation to the immobilized persons hands. After the computer confirms that the targeted person is immobilized, it effects the storage of the immobilized person's image. This stored image is then used by the computer as a reference for comparison with each of the immobilized person's currently input surveillance image frames. Such comparisons enable computer 22 to detect the slightest movements of each immobilized person. The parameters for the limits of such movements are programmed into the computer and, if those movement parameters are exceeded by an immobilized person then, that person is re-immobilized via the firing of at least one immobilizing projectile in order to prevent that person's flight to avoid capture.

If the immobilized person has a weapon in his, or her hand, during such surveillance, and shows evidence of physical movement, or if that person attempts to re-acquire a dropped weapon, then the computer is programmed to effect the firing of a second pair of immobilizing projectiles at the targeted individual. The various possible scenarios relating to such circumstances are to be studied and the human image models derived from such studies are to be incorporated in database 62. These image models are used by computer 22 as a basis for comparisons with current surveillance images, and the outcomes of such comparisons are used by computer 22 to determine whether or not, the immobilized person must be re-immobilized. This should prevent the immobilized person from harming others, doing self-harm, or escaping capture. Computer 22 is programmed to maintain the optical surveillance of any immobilized persons at least until the authorities arrive.

The system's computer 22 is programmed to maintain the continuous optical tracking and targeting of the surveilled person, during which time, it performs ongoing analyses of the surveilled person's images, frame-by-frame, as that person moves within the confines of the host facility. The computer 22 is programmed to maintain its surveillance and targeting of that person until that person either draws a weapon or exits the host facility. When an uneventfully surveilled person exits the host facility, the metal object is again detected by the metal object detector of a MOD sensor unit 36. Computer 22 detects the exiting of the surveilled person, both optically (via the inputs from at least one SIM unit), and via the input from one of the peripheral, MOD sensor units. 36 on multi-conductors 72 and 22O. The computer 22 is programmed to terminate its surveillance of the targeted individual when those criteria are met.

The system is configured and programmed so as to be flexible with regard to its responses to various security scenarios which may arise. If an armed person attempts to defeat the system by interfering with its ability to identify the detected metal object, e.g., by concealing a weapon in-hand, inside, e.g. a shoe box, paper bag, or other container or, by holding and pointing a weapon in an unmodeled unusual fashion or, from within a coat pocket etc., then, such a person can still be defeated via the manual use of at least one, locally installed, manually controlled, panic button 74, FIG. 4. Each panic button 74 inputs to digitizer 116 via conductors 75 and onward, to computer 22, via conductors 76. When such an armed person enters the host facility, the system would automatically be engaged in the above-cited tracking, and targeting procedures. When such an armed person approaches and threatens, e.g., an employee, who is proximate to one of the above-cited panic buttons, and the threatened person perceives an armed threat, the panic button, which is installed at that specific location, can be manually switched on, by that employee. The ATI system is configured so that pre-determined sites within the host facility are each protected by at least one such panic button. Each such local panic button, governs the activation of the system's panic immobilization phase at it's assigned, localized site. Once such a panic button is engaged, it enables computer 22 to operate under the presumption that an armed threat condition exists, and is in progress at that site. A local panic button is manually activated only when the targeted person communicates his/her intent to commit violence at that site, with or without, the accompaniment of a visually brandished weapon. The computer is programmed to operate under the assumption that any unrecognizable object, which is drawn, and/or held, by a targeted individual, while in proximity to the activated panic button site and, which is pointed at a non-targeted person, is an unidentifiable weapon. The computer is also programmed to interpret the concealment of at least one hand, by a targeted person, while in proximity to the activated panic button site, as an armed threat condition and, is programmed to operate under the assumption that the concealed hand is holding a weapon.

During the system's panic immobilization phase of operation, the system's computer is programmed to intensely analyze the surveillance images of the tracked and targeted person for the appearance of pre-aggressive movements, postures, and/or gestures and, for the incremental appearance of at least one, weapon image. The computer utilizes inputs from at least one SIM unit 34 in such analyses and, is programmed to control the aiming of at least one ATRM unit most proximate to the surveilled area, in which the panic button was manually activated. The computer, 22 is programmed to detect and to isolate the image of at least one hand-held object, which is held by the targeted person and, to calculate the angle of the forearm of the hand, which is holding that object, in relation to the physical location of the most-proximate, non-targeted individual in each successive image frame. In instances when a weapon is concealed in and pointed from, for example, a targeted person's coat pocket, the computer calculates the angle of the forearm, of the concealed hand, in relation to the physical location of the most-proximate, non-targeted individual in each successive image frame.

The purpose of such calculations is to enable computer 22 to determine whether or not, a targeted person's forearm is directly aligned with any non-targeted person within each image frame. During the panic immobilization phase of operation, the computer 22 analyzes the targeted person's image, within each successive, surveillance image frame, including the re-calculation of the spatial and angular relationships between the targeted person's forearm, and any, proximate, non-targeted persons, within each image frame. If the computer determines that the targeted person's forearm is pointed directly at a non-targeted person, the computer 22 is programmed to delay its firing of at least one, immobilizing projectile from at least one proximate ATRM unit, at the targeted person. The delayed firing of the system's proximate ATRM units is intended to prevent possible injury to bystanders by the unintentional discharge of the concealed weapon via involuntary muscular contractions, which will probably occur during the immobilization of the targeted person. When the computer's ongoing analyses of such surveillance images eventually determines that the targeted person is no longer pointing something directly at any proximate, non-targeted person, the computer is programmed to effect the immediate firing of at least one immobilizing projectile, at the targeted person. Since the system effects the video recording of the activities of targeted persons, such a record would also include the use of the panic button and would document the identity of its user. All events leading to the immobilization of any targeted person would be duly recorded and preserved as potential evidence for use in the eventual prosecution of such persons.

If an armed person enters the system's host facility carrying a shield (such as a Lexan Riot Control Shield) in an attempt to gain protection from ATRM fire, the ATI system is configured to fire at least one ATRM unit from a perspective which will allow the armed person to be struck, on an unshielded area of the body (e.g. struck from behind). The deployment of at least one remote ATRM unit near each facility entrance can augment the system's security coverage of the facility in this regard.

If the surveilled person attempts to draw the detected metal object from concealment within the field of view of at least one SIM unit 34 whether an attempt to threaten is being made, or whether that person attempts to pass the object to another person, or to hide the metal object within the facility, and the system identifies the object as a weapon then, computer 22 initiates the firing of the ATRM unit 38 at the surveilled person, thereby immobilizing the armed person. If, for example, the surveilled person has an unarmed accomplice within the facility and attempts to pass a suspected weapons object to that person, and the system is unable because of image obscurement to positively identify the object as a weapon. For such occurrences, the computer is programmed to place both persons under active surveillance including the targeting of them for possible immobilization. The system maintains its surveillance of such individuals, for the duration of their stay within the host facility. The system is configured and programmed to employ at least one additional set of ATI peripherals to facilitate such surveillance and targeting. Such surveillance is intended to cover the passing of a weapon to at least one, other persons within the confines of the host facility, and is intended to thwart such attempts to defeat the system. In addition, several more of the MOD sensor units 36 can be placed at strategic points within the interior of the host facility as a means for the computer to confirm the presence and movement of a previously detected, concealed metal object as well as, to detect the presence of metal objects on previously unsurveilled persons. Computer 22 is programmed to place such a previously unsurveilled person under surveillance if a metal object, which meets system criteria, is detected on that person.

Figure 2:
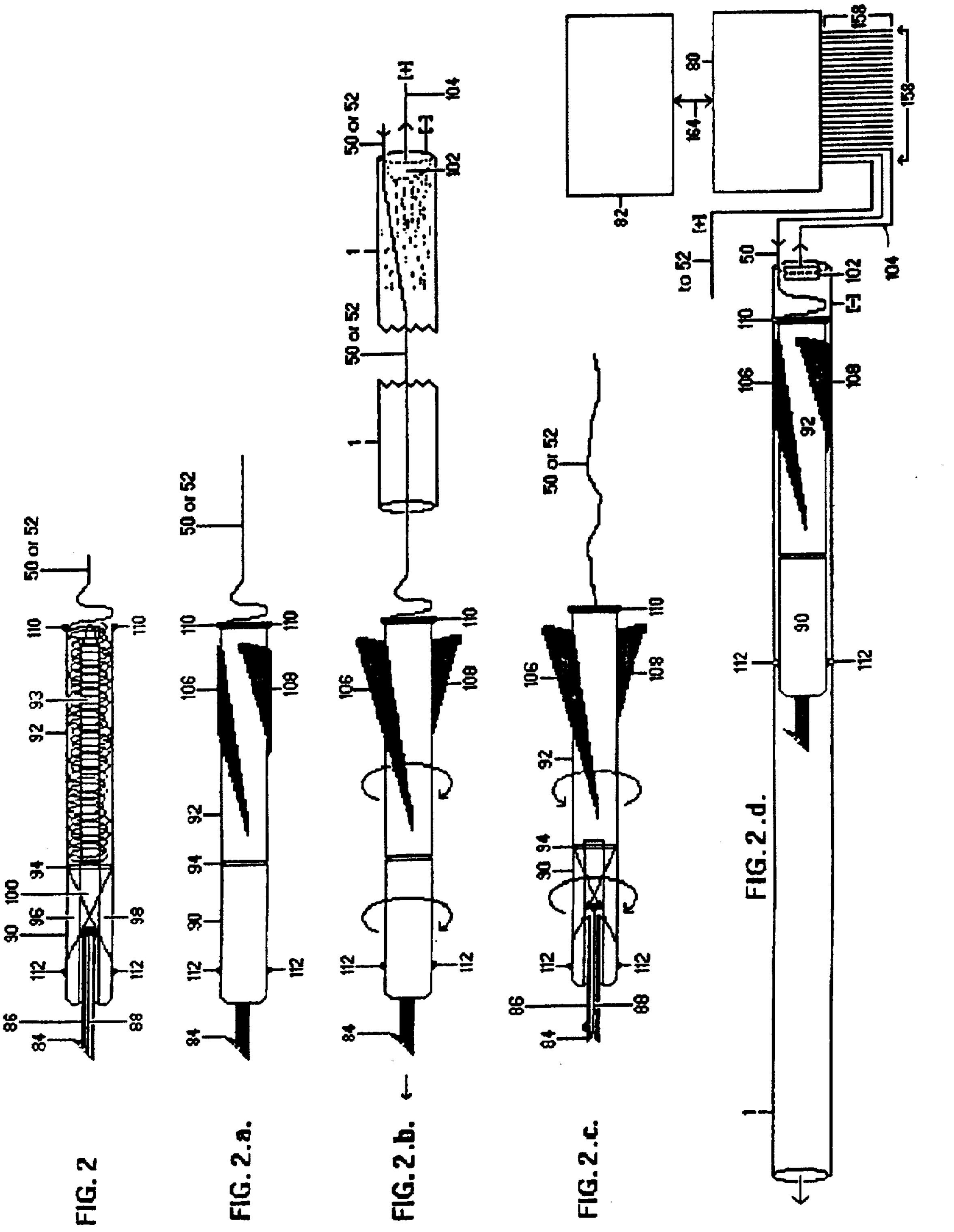
FIG. 2 illustrates a cross-sectional transparency of one of the two immobilizing projectiles, fired in FIG. 1*a*.

The Armed Threat Response Mechanism, referred to herein as an ATRM unit, is comprised of a modularized casing, which is endowed with at least one, laser targeting/intimidation device and a number of individual, launching tubes, each of which, is loaded with at least one immobilizing projectile as illustrated in FIG. 2*d*. In the present embodiment, each of the launching tubes of each of the ATRM units 38 of FIGS. 1, 1*a*, 3 and 4 and, each of the Remote ATRM units 46 of FIG. 4, is loaded with at least one immobilizing projectile of the type shown in FIGS. 2–2*d*.

Figure 3:
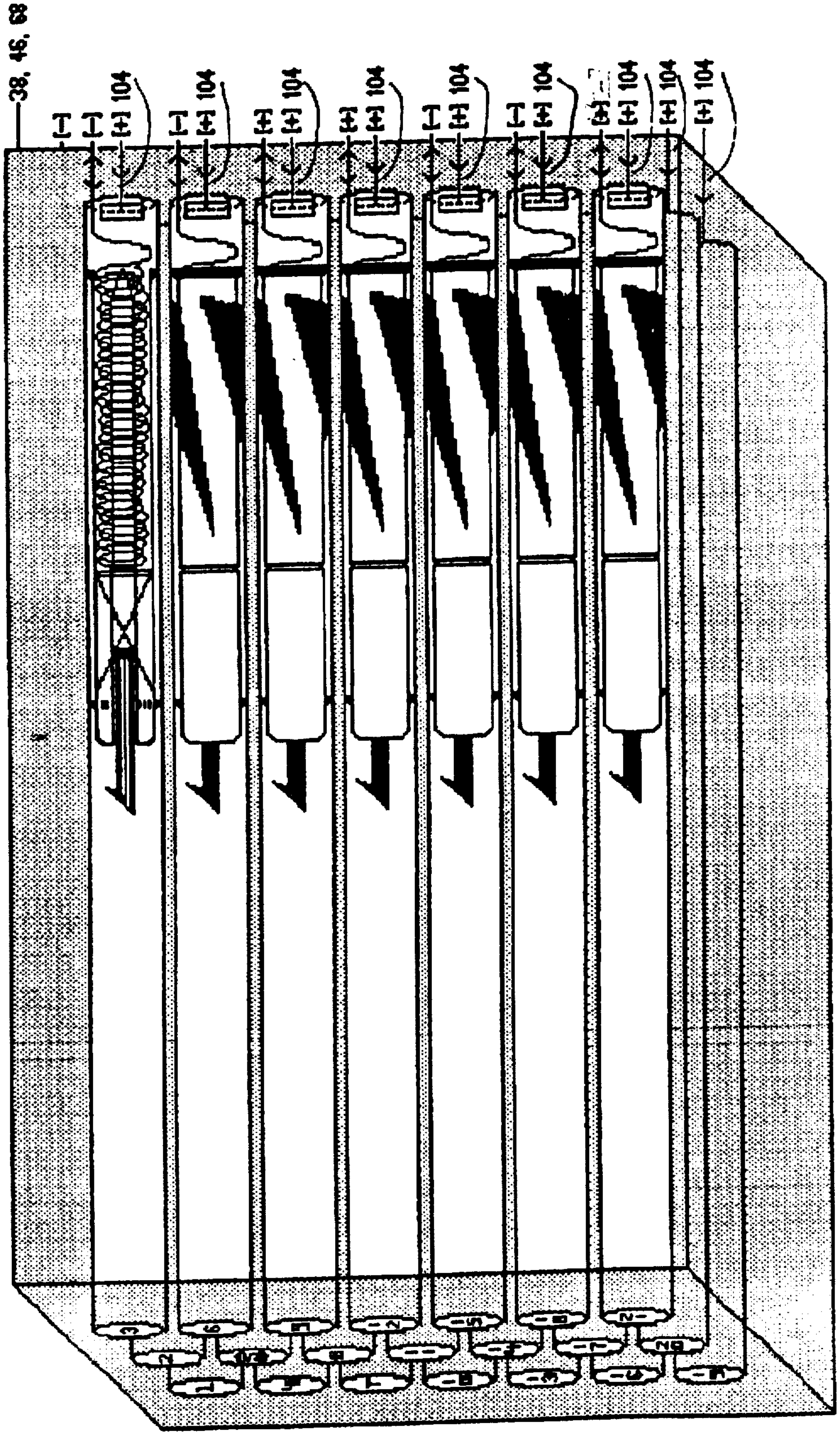
FIG. 3 illustrates a cross sectional transparency of one possible configuration of the Armed Threat Response Mechanism of FIGS. 1 and 1*a*.
Figure 6:
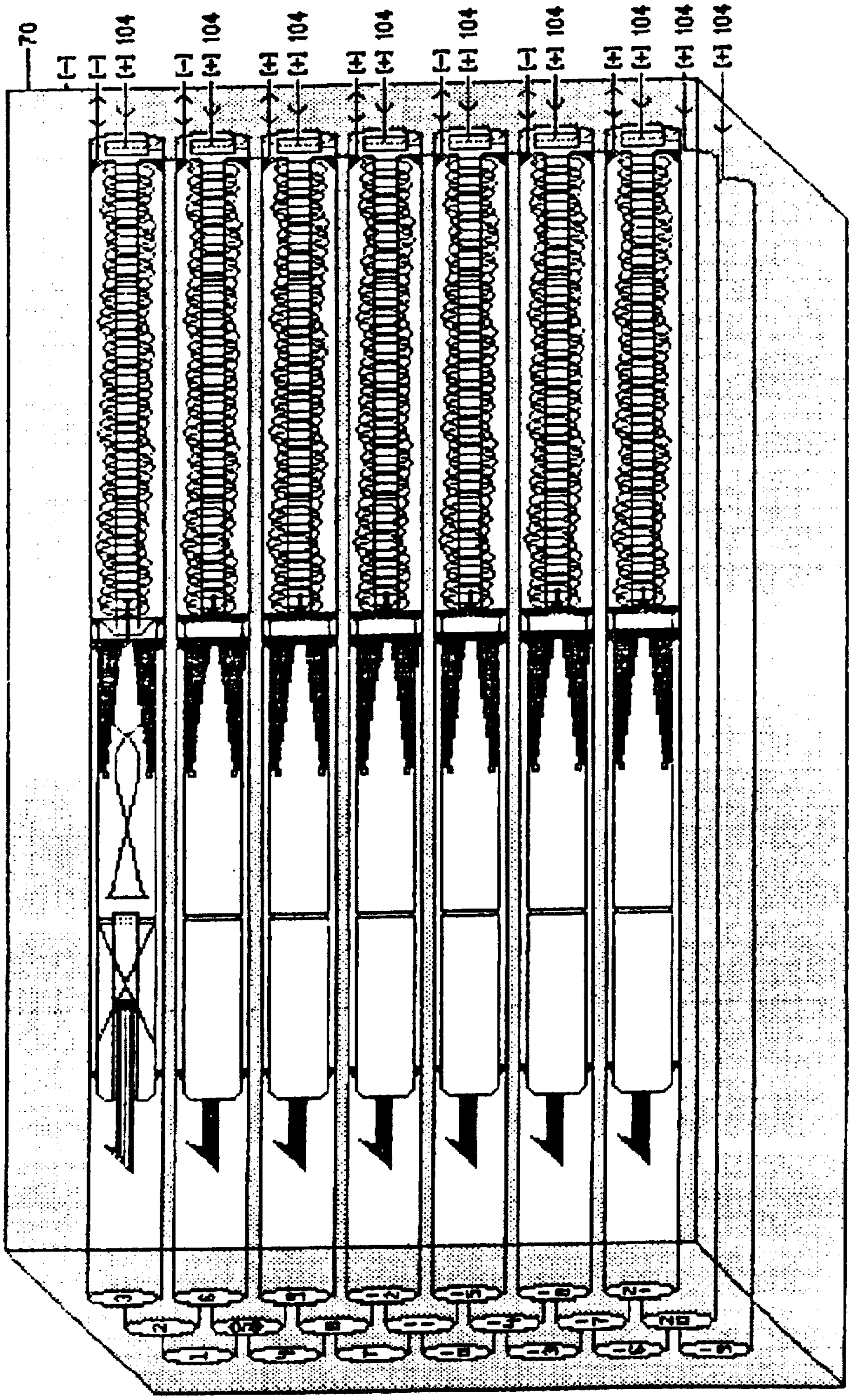
FIG. 6 illustrates a cross sectional transparency of another possible configuration of the Armed Threat Response Mechanism of FIG. 3.

In general, FIGS. 3, and 6 illustrate two of a number of possible configurations for the ATRM unit 38 of FIGS. 1, 1*a*, and 4 and for ATRM 46 of FIG. 4. For purposes of illustration, each of these ATRM units is endowed with 20 launching tubes, numbered 1–4, and 6–21, and at least one laser targeting/intimidation device 78 which is housed in tube number 5 of FIGS. 1, 1*a*., 3, 4 and 4*a*. Each of the launching tubes is loaded with at least one immobilizing projectile. Within any given embodiment of the invention, the launching tubes of each of the system's ATRM units may be loaded with at least one projectile type of the types shown in FIGS. 2–2*d*., 5–5*d*., or 5*e*–6*f*. The ATRM units of FIGS. 1, 1*a*., 3, 4 and 6 are negatively grounded.

In the present embodiment, the ATRM unit 38 of FIGS. 1 and 4 houses 10 pairs of launching tubes, numbered 1–4 and 6–21, and at least one laser targeting/intimidation device 78 which is housed in tube number 5. Each launching tube encases at least one, of a pair of immobilizing projectiles 54 or 56 of the type illustrated in FIGS. 2–2*d*. and a propellant charge 102. The 10 pairs of launching tubes are physically arranged to enhance the system's firing precision in an arbitrarily chosen pattern comprised of 7 horizontal rows of 3 each, the openings of which are shown, facing the direction in which the immobilizing projectiles are intended to be fired. The laser 78 is used as an intimidation device, in combination with the system's verbal communication with the targeted individual(s). The laser beam would be visibly trained onto the body of a targeted individual immediately upon the detection of a weapon, and would appear as a bright, highly visible dot. In such usage, the system would effect the imposition of the laser dot on the individual, would verbally communicate with that individual, to "DO NOT MOVE, OR YOU WILL BE STUNNED", and would alert security personnel to the presence of the armed individual.

The ATRM Firing Controller 80 is comprised of a combination of computer-controlled, current-switching and current-regulating devices, which enable computer 22 to control the following functions: the firings of individual projectile pairs; the discharging of at least one dose of high voltage, low amperage current, from High Voltage Source 82 through the appropriate conductors 50 and 52 of each fired projectile pair only; the regulation of the magnitude, of the voltage and amperage of the current being so discharged; and, the conduction of bio-telemetry information from an immobilized person to computer 22 via conductors 50 and 52. The High Voltage Source 82 supplies a high voltage, low amperage current, which the ATRM Firing Controller 80 discharges through the tethered conductors 50 and 52, of each fired pair of immobilizing projectiles under the control of computer 22. The High Voltage Source 82 is comprised of a device, such as a direct current, high voltage coil, having an adjustable output.

One of a number of possible wiring relationships between an immobilizing projectile and components 80 and 82 of FIG. 4 is also shown in FIG. 2*d*. The projectiles 54 and 56 of each projectile pair, are wired with conductors 50 and 52, respectively, for carrying doses of high voltage, low amperage current when fired in tandem. It should be noted that projectiles 54 and 56 of FIGS. 1*a*. and 4 are comprised of different projectile types, depending on which embodiment of the invention is under discussion.

At least one modular ATRM unit 3 FIG. 4 is aimed in conjunction with the aiming of the modular SIM unit 34 via the computer's precise control, of the ATRM Servo mechanism 28. The launching tubes of the ATRM unit 38 are precisely aligned in relation to one another and, in relation to the physically attached, modular SIM unit 34. All relevant launching tube alignment, and positional relationships for each modular ATRM unit, are pre-defined, are programmed into computer 22 and, are utilized in the computer's calculation of the instructions, which govern the aiming of each modular ATRM unit via its respective servo mechanism 28. The computer 22 is programmed to utilize the data, representing the above-cited, launching tube positioning and alignment relationships when it calculates and re-calculates each set of target coordinates for each targeted person and, when it calculates and re-calculates, the trajectory of each projectile to its intended target site.

At least one Remote ATRM unit, 46 FIG. 4, is aimed in conjunction with the aiming of at least one modular SIM unit 34 via the computer's precise coordinated control of the ATRM servo mechanisms 30 and 28 respectively, in accordance with a secondary set of target coordinates, which are calculated, for use in the aiming of the Remote ATRM unit 46. All relevant launching tube alignment, and positional relationships for each Remote ATRM unit are programmed into computer 22 and are utilized in the computer's calculation of the instructions, which govern the aiming of each Remote ATRM unit, via its respective servo mechanism 30. The computer 22 is programmed to utilize the data representing the above-cited, launching tube positioning aid alignment relationships, when it calculates and re-calculates each set of target coordinates for each targeted person and, when it calculates and re-calculates the trajectory of each projectile to its intended target site.

The firing accuracy of Remote ATRM units is also related to computer 22's target image analyses, whereby computer 22 is programmed to optically identify and retain the positions of each of the Remote ATRM units, optically visible by, at least one of their associated SIM units 34 and, in relation to a targeted individual. Computer 22 is programmed to calculate and impose target coordinates onto such targeted individuals based on the use of optical triangulation.

In an example of optical triangulation, the known position of at least one of the Remote ATRM units 46 existing Within the field of optical surveillance of at least one associated SIM unit 34, the pre-calculated distance of each. Remote ATRM unit from each associated SIM unit 34 and, the angular relationships between a targeted person and each of several, proximate SIM and ATRM units as derived from the computer's analyses of each targeted person's surveillance images, can be used in defining the position of each targeted person in relation to at least one proximate Remote ATRM unit. Such calculations are actively re-calculated in accordance with the movements of targeted individuals within the confines of the host facility. In response to such movements, computer 22 calculates the selection of the Remote ATRM unit, which is in the best position for striking the target, and assigns a ready-to-be-fired status to that ATRM unit based on the targeted individual's current position. This ready-to-be-fired status includes the physical aiming of that ATRM unit at a targeted individual in accordance with that individual's previously assigned target coordinates, and the selection of at least one of that ATRM's immobilizing projectiles in preparation for possible firing.

The foregoing, enhances the system's reliability, by ensuring that each immobilizing projectile of each ATRM unit is aimed with mechanical precision, in accordance with each actively surveilled, person's assigned target coordinates. Care is to be taken in the design and construction of ATRM units, in order to prevent an electrical short, or a static electricity charge, from unintentionally discharging any of the unfired projectiles. Similar care is to be taken to ensure that the discharging of a high voltage current through the fired projectiles is capable of occurring only under the direct control of computer 22. Additional care is to be taken to maintain the integrity of the individual launching tubes with regard to preventing dust, insect, or other debris, from being deposited within those launching tubes. The sterility of each projectile's probe during its storage in a launching tube should be ensured to reduce the likelihood of infection, as a consequence of immobilization. A thin, frangible film covering, sealing the individual tube openings, is recommended for this purpose.

Generally, each immobilizing projectile 54 and 56 of each projectile pair, and, of FIGS. 1*a*.–6, is an aerodynamic, dart-like object, which has a retractable barb 84 at the tip of its probe 86 in FIGS. 2, 2*c*., 5 and 5*c*. The probe 86 of FIGS. 2, 2*c*., 5 and 5*c*. of projectiles 54 and 56, is hollow and has a barb-retracting rod 88 within it. The barb-retracting rod 88 should be comprised of a material which will remain viable, even if the probe 86 becomes deformed when striking its target. After a targeted individual has been immobilized, the projectile is removed from that person's clothing or skin by manually rotating the two projectile sections 90 and 92 of FIGS. 2*c*. and 5*c*., which are joined at connection 94 in opposite directions. In FIGS. 2*c*. and 5*c*., the manual, opposing rotations: of projectile sections 90 and 92 cause the camming of retractor cams 96 and 98, which in turn, effects the withdrawal of the barb-retracting rod 88 into recess 100. The retraction of rod 88 enables barb 84 to freely rotate approximately 135 degrees forward during its removal from the immobilized individual, thereby allowing probe 86 to be pulled from that individual's clothing or skill, without resistance or further injury. The length of the probe 86 and the power of the propellant charge 102 can be varied in accordance with the desired penetration of the probe into its target, in relation to its intended deployment. For example, in ATI systems protecting nuclear facilities or embassies, a longer probe length and greater propellant charge, may be desired to ensure their penetration of electrically insulated outer garments, such as the scuba diving wet suits.

In FIGS. 1*a*., and 4, a pair of immobilizing projectiles 54 and 56 of the type illustrated in FIGS. 2*b*., 5*b*., or 5*e*., is shown traveling away from its ATRM unit 3 en route to its intended target. Each of the immobilizing projectiles 54 and 56 including its barb and probe is made of electrically conductive materials and is tethered to its ATRM unit, FIGS. 3 and 6, via electrical conductors 50 and 52, respectively. The projectiles 54 and 56 are in electrical contact with their ATRM unit via their attachment to their respective, tethering conductors 50 and 52. The tethering conductors are attached to their projectiles 54 and 56 internally, in FIGS. 2–2*d*. and, externally at protrusion 189 in FIGS. 5–5*f*, respectively. The tethering conductors 50 and 52 are comprised of a durable, insulated, high tensile-strength, electrically conductive material of fine diameter, and are stored, coiled, or otherwise arranged, within the bodies of their respective projectiles, or within, or proximate to their respective immobilizing projectile launching tubes. The electrical conductors 50 and 52 are of sufficient length, when extended after firing, to adequately reach at least one targeted individual within the ATRM unit's range of surveillance, and are played out behind each projectile 54 and 56, respectively, when those projectiles are fired. The conductors 50 and 52 of each pair of immobilizing projectiles are in individual electrical contact with at least one High Voltage power Source 82 FIG. 4, which can be selectively discharged through the paired conductors 50 and 52 via Firing Controller 80 under the control of the ATI System computer 22. It should be understood that other projectile configurations may include, but are not limited to the inclusion of, the firing of two or more projectiles from a single launching tube, and that such variations fall within the scope and intent of the present invention.

Each projectile pair is wired so that one projectile of the pair carries a negative conductor 50 and that the other projectile of the pair carries a positive conductor 52. The wiring of projectile pairs is such that computer 22 can effect the discharging of a high voltage, low amperage, immobilizing current through the paired conductors 50 and 52 when such projectile pairs impact their intended target. The propellant charge 102 of each projectile of FIGS. 2*b*., 2*d*. and 5*d*. or, the propellant charge 21 of each projectile of FIGS. 5*e*. and 5*f*., is wired to enable computer 22 to selectively effect its ignition, and projectiles are wired for firing in pairs. Conductors 50 and 52 of each projectile pair are also wired via Controller 80 so as to enable computer 22 to obtain and monitor, bio-telemetry information from an immobilized person. Both projectiles 54 and 56 of each projectile pair are fired simultaneously, from their launching tubes via the computer's ignition of their respective propellant charges 102, FIGS. 2*d*. or 5*d*. via the appropriate conductors 104. When a projectile pair impacts on a target, projectile 54's conductor 50 will carry the negative pole of the high voltage current from the High Voltage Source 82 of FIG. 4, while projectile 56's conductor, 52 will carry the positive pole, when Controller 80 discharges the high voltage current through the target via said projectile pair. Each of the other projectile pairs is likewise connected. The ATRM units of FIGS. 1, 1*a*., 3, 4, and 6 are negatively grounded.

In FIG. 2, a cross-sectional transparency of one of the immobilizing projectiles 54 or 56 of FIGS. 1*a*. and 4 is shown. The projectile's retractable barb 84 is shown in its extended position and, the lengths of the tethering conductors 50 or 52 are shown housed in the projectile's rear body section, 92. These tethering conductors are loosely stored about their spindle 93 to facilitate their smooth deployment during firing. Not shown, are the projectile's exterior, foldable, angular fins 106 and 108. It should be noted that all identical elements existing among FIGS. 2–2*d*. and 5–5*f*. are identically numbered among those figures.

FIG. 2*a*. illustrates the projectile of FIG. 2 shown with its externally attached, foldable, angular fins 106 and 108 wrapped around the projectile's rear body section 92. In this condition, each projectile is retained in its launching tube 1, FIG. 2*d*.

Generally, the projectiles of both FIGS. 2–2*d*. and 5–5*f*. have propulsion gas seals 110 at the rear and stabilizing knobs 112 at the front. The propulsion gas seals 110 prevent the escape of propulsion gases and consequent loss of pressure during the firing of the projectiles. The stabilizing knobs 112 (only two of which are illustrated in the figures), together with the propulsion gas seals 110 contribute to the projectile's stability within the launching tube during firing and allow the friction between the inner launching tube surfaces and the foldable, or retractable fins 106 and 108 to be translated into a stabilizing projectile spin prior to the projectile's exiting from its launching tube. This stabilizing spin will continue and be maintained by the projectile's angular fins as they unfold during flight.

FIG. 4 illustrates the tandem firing of a pair of projectiles 54 and 56 from ATRM 38's number 1 and 7 launching tubes. Each such projectile is equipped with foldable or retractable, angular fins 106 and 108, FIGS. 2*a*–2*d*. or 5–5*f*., respectively, which either unfold or emerge via tension from fin springs 14 respectively, at a slight angle to the horizontal, linear plane of each of the projectiles, when those projectiles exit their respective launching tubes 1 FIGS. 2*d*., 5*d*. 6*f*., after being fired. The foldable fins 106 and 108 of FIG. 2*a*. are comprised of a memory plastic or metallic material. This allows these fins to unfold and assume their normal positions, as shown in FIG. 2*b*. when the projectile exits its firing tube, 1. In either case, the angularity of these fins is designed to impart rotation to the projectiles when they are fired. This curvature, of the fins 106 and 108 gives the projectiles 54 and 56 of FIGS. 1*a*., 2*b*. 4 and 5*b*. a stabilizing spin during flight. This spin should be in the opposite direction to that in which the conductors 50 and 52 are wound, while stored in the rear of their respective projectiles, or in the rear of their respective launching tubes. The projectile of FIG. 2*b*. illustrates the projectile of FIGS. 2*a*. and 2*d*. in post-fired flight, showing the projectile's spin about its longitudinal axis as well as, the deployment of its tethering conductors 50 or 52. In FIG. 2*c*., a partial transparency of the target-impacted projectile of FIG. 2*b*. is shown. Its body sections 90, and 92 are shown as having been rotated opposite to one another, in order to effect the release of the projectile's barb 84 from its extended position.

When a pair of projectiles 54 and 56 is fired and strikes a targeted individual, the barb on each projectile's tip effects the projectiles' physical attachment to the targeted individual. The computer 22 is programmed to precisely time the arrival of each pair of projectiles at their target, and to effect the brief conduction of a high voltage, low amperage current through the projectile pair's conductors 50 and 52 and into the targeted individual on impact, thereby immediately rendering the targeted individual unconscious. The cited voltage should be preset at a level which will effectively stun the targeted individual without causing permanent injury or death. The computer is programmed to effect the discharging of only one dose of stunning current into conductor pairs 50 and 52 of each fired pair of projectiles. This will prevent innocent persons from being unintentionally stunned in the event that they make contact with the fired projectiles 54 and/or 56, or their components or, with the immobilized individual's body.

The computer 22 of FIG. 4 is programmed to individually monitor the metal detector inputs from each of its multiple MOD sensor units 36 on multiples of conductors 72 and 220. The computer is programmed to interpret the data received from each of these sensors in determining whether or not, a detected, concealed metallic object is of sufficient mass and dimensions to potentially be a weapon and, where on the person, such a detected object is located. When a potential weapons object is detected, computer 22 effects the initiation of optical surveillance via conductors 112 and 114 of the individual, on whose person that metal object was detected. The video images produced by the surveillance imaging means or SIM unit 34 are fed into a digitizer 116 via conductors 112 and then on to computer 22, via conductors 114. The computer 22 is programmed to effect the recording of information pertaining to each active surveillance incident, in addition to effecting the recording of an audio/video record of that individual's immobilization, and apprehension, via the Video Recording Means or VRM 118 FIG. 4. Component 118 is comprised of at least one VCR (video cassette recorder), or other, audio/video recording means suitable to that purpose such as, the use of a read/write optical drive and media. It receives video input from the SIM unit 34 via conductors 120 and is controlled by computer 22 via the Video Recording Means Controller or VRMC 122 on conductors 124 and 126, with feedback signals returning to computer 22 via digitizer 116 on conductors 128 and 130. The VRMC 122 component is comprised of a digital-to-analog converting means and various switches, which are wired to enable computer 22 to control the operation of the VRM unit 118.

In association with the images produced by the Surveillance Imaging Means 34, computer 22 is programmed to operate the Servo mechanism, 28, via the ATRM Servo Controller 132 using conductors 134 and 136 with sensory feedback being fed into digitizer 116 via conductors 138 and then into computer 22 via conductors 140. Such programming and configuration allows computer 22 to coordinate the surveillance tracking movements of SIM 34 with the surveillance images received and, with the Target Acquisition Means 48 which is accessed via conductors 142. This enables computer 22 to effect, and control the optical tracking of a target in coordination with the aiming of an ATRM unit 3 at that target during the system's active surveillance of that target. In addition, computer 22 is programmed to operate at least one lens focusing and zooming, servo mechanism at the lens mechanism 32 via the Lens Servo Controller 144, using conductors 146 and 148. Computer 22 is programmed to utilize the surveillance images transmitted on conductors 112 and 114 as feedback during its control of the servo, which focuses lens mechanism 32, thereby enabling the computer to focus, and enhance those surveillance images on demand. Thusly, computer 22 controls the focusing and zooming features, which improve the quality of the detail of the surveillance images being analyzed.

The system's computer 22 is programmed to access and utilize the Video Image Analyzing Means 64 via conductors 150 during the system's active surveillance of a targeted individual, said analyzing means being comprised of algorithms, which are specifically written to enable the computer to analyze the image content, which is relevant to at least one, targeted individual within the video images which are input from SIM 34. This analysis is performed by computer 22 on a frame-by-frame basis in coordination with the use of the Artificial Intelligence and/or Fuzzy Logic algorithms 66 and the human movements/posturing/weapons identification portion of database 62, which are accessed via conductors 152 and 154, respectively. The computer 22 is programmed to compare the surveillance images of each targeted person, frame-by-frame, to the image models which are stored in database 62, and which are accessed via conductors 154. The computer is programmed to compare the data representing the incremental movements of such individuals to a pre-compiled, image-based, database 62, which is comprised of image models representing and encompassing the range of potentially hostile movements and postures, assumable by the human form. In such comparisons, the computer 22 uses Artificial Intelligence and/or Fuzzy Logic algorithms 66 in attempting to match, or approximately match, the movements and postures under analysis to the movements and postures of the image models stored in database 62. With regard to image modeling, as it relates to the scope and intent of the present invention, it is to be utilized in its current form, until a more accurate means for image analysis relating to postural and weapons identification, is developed, and all such usage, as it applies to the present invention, is claimed herein.

The ATRM unit 38 of FIG. 4 is aimed in conjunction with the aiming of the SIM unit 34 via the Servo mechanism 28 and in accordance with the imposed target coordinates, which are obtained via the use of the target's image, which is digitized, and input into the computer 22 from the SIM unit 34. The firing of projectiles from the ATRM unit 38 is controlled by computer 22, FIG. 4, via its interface with the ATRM Firing Controller 80 using multi-function, multi-conductors 156 and 158.

The Firing Controller 80 enables computer 22 via the ribbon cable multi-conductor 156 to control the firings of individual projectile pairs and, to control the discharging of a singular dose of high voltage current through the appropriate conductors 50 and 52 of each fired projectile pair only via multi-conductor 158. The Firing Controller 80 is also configured to enable computer 22 to regulate the magnitude of the voltage and the amperage of the current being so discharged and, to conduct bio-telemetry information from an immobilized person to computer 22 via multi-conductors 160 and 162 for interpretation. The computer 22 is programmed to approximate the mass of a targeted individual based on the optical measurement of that individual's surveillance image and, to adjust the strength of the immobilizing current in relation thereto. Therefore, the larger the targeted individual is, the higher the immobilizing voltage and stunning current will be. The High Voltage Source 82 is operatively connected to the Firing Controller 80 via conductors 164 in a manner, which will allow the Firing Controller 80 in accordance with instructions received from computer 22, to effect the selective conduction of a brief dose of high voltage, low amperage current through conductors 50 and 52, of each newly fired pair of immobilizing projectiles 54 and 56 via multi-conductor 158. Multi-conductor 158 is comprised of a ribbon cable, which establishes individual electrical connections between the components of the ATRM unit 38 and the Firing Controller 80 for both the firings of individual projectile pairs via individual conductors 104 of FIGS. *2b*. and *2d*. and, for the selective discharging of a singular dose of high voltage current through the appropriate conductors 50 and 52, of each fired projectile pair.

At least one Remote ATRM unit 46 FIG. 4, is aimed in conjunction with the aiming of at least one SIM unit 34 via the computer-coordinated movements of the ATRM Servo mechanism 30. The functional operation of the Remote ATRM unit 46 is controlled by computer 22 via multi-conductors 166 and 168. The firing status of ATRM 46's projectiles before, and after, each projectile firing, as well as the target's bio-telemetry information (which is obtained after each firing) is input to digitizer 116 via multi-conductors 170, and onward to computer 22 via multi-conductors 172. The computer 22 is programmed to change its optical perspectives, during surveillance, by actively and flexibly switching from one SIM unit to another and from one ATRM unit to another, in coordination with and, in relation to, the quality of the targeted individual's surveillance image and, in relation to the maximum firing range of the active ATRM unit during the course of the targeted individual's movement, within the confines of the system's host facility. This capability enables computer 22 to obtain the best surveillance image possible, and, to optimize its coverage of any given target. In association with the images produced by SIM 34 the computer 22 is programmed to operate the Remote ATRM 46's servo mechanism Servo 30 via ATRM Servo Controller 132 using conductors 174 and 176 with sensory feedback being input into digitizer 116 via conductors 178, and then into computer 22 via conductors 180. The computer 22 is programmed to coordinate the surveillance tracking movements of the SIM unit 34 with the surveillance images received and, is programmed to effect the assigning of target coordinates for use in aiming the ATRM unit 46 by utilizing the Target Acquisition Means 48 which is accessed via conductors 142. This enables computer 22 to effect and control the optical tracking of a target in coordination with the aiming of at least one, remotely located, Armed Threat Response Mechanism ATRM 46 at the target, during the system's active surveillance of that target.

The firing status of ATRM 38's projectiles before and after each projectile firing, as well as the target's biotelemetry information (which is obtained via conductors 50 and 52 after each firing), is input to digitizer 116 via multi-conductors 160 and onward to computer 22 via multi-conductors 162. The computer is programmed, to effect the individual measurement of the electrical resistance of conductors 50 or 52 of each immobilizing projectile, of each peripheral ATRM unit prior to the firing of any projectiles. The computer is programmed to store the individual, electrical resistance measurement data of each unfired immobilizing projectile. The computer 22 is programmed to remeasure the electrical resistance of each projectile's conductor 50 or 52 after an immobilizing projectile firing has occurred. The computer is programmed to compare the pre- and post-firing electrical resistance measurement data of each fired projectile's conductor 50 or 52. If such a comparison determines that these resistance measurements are the same before and after firing the computer is programmed to interpret this occurrence as a misfiring, and is programmed to initiate the immediate firing of another pair of immobilizing projectiles at the current target coordinates. The computer 22 is programmed to evaluate the firing status of each subsequently fired pair of launching tubes, and to retain data pertaining to the identities of fired and unfired pairs of launching tubes. The computer uses these data in selecting unfired projectile pairs for subsequent firings. It should be noted that the above-cited measurement of electrical resistance as it applies to FIGS. *5e*., and *5f*., may utilize an electrical current, which is of insufficient magnitude to ignite the projectile, which being tested for electrical resistance.

The firing of each independent pair of immobilizing projectiles from the ATRM unit 38 of FIGS. 1, *1a*., 3 and 4, is controlled by computer 22 via multi-conductors 156 and 158. The actual propulsion of each projectile, can be accomplished in a number of ways. Such methods may include, but are not limited to the use of: pyrotechnic devices, the controlled valving of compressed gases, electromagnetic propulsion, compressed springs, etc. The present embodiment of the invention utilizes electrically ignited, pyrotechnic devices to achieve the propulsion of its immobilizing projectiles. The most practical and cost-effective method toward this end, at present, would seem to lie in the utilization of such pyrotechnic technologies.

In the present embodiment, each of the MOD Sensor units 36 of FIGS. 4 and 7, is comprised of at least one Transponder Signal Transmitter/Receiver component, such as: the Checkpoint QS-2000 System's Radio Signal Transmitter/Receiver, doorway device 202 FIGS. *7–7a*., which is functionally combined with at least one Metal Object Detection component group, 204 and 206 FIG. 7, which magnetically detects the presence and approximate location-on a person's body, of each metallic object of significant mass, entering the host facility, and, which communicates each such detection, to computer 22 via multi-conductors 72 and 220.

In the present embodiment, the metal object detection component of the MOD sensor units 36 of FIGS. 4 and 7 is comprised of at least one housing 204 FIGS. 7, and 8, having, e.g. 4 electromagnets 216–219, installed therein, and at least one housing 206 FIGS. 7 and 8, having, e.g., 9 magnetic flux gate sensors 207–215 installed therein. The magnetic flux gate sensors, used in the present embodiment are functionally similar to the type found in commercially available, electronic compasses, such as those offered as automotive options, by General Motors on their T-Blazer model as part number 12384628, or by Chrysler Corporation on their Dodge Mninivan models, as part number 46 85 012. Such devices have also been offered for sale in the recent past by Radio Shack Corp., as an aftermarket, automotive option. Each of these sensors is individually wired to input its analog signals to digitizer 116 of FIG. 4 via the multi-conductors 72 and, from digitizer 116 to computer 22 via multi-conductors 220 for interpretation and response.

Each electromagnet of FIGS. 7, and *8a–8c*. is continually supplied with direct current, which is sufficient to produce a continuous, uniform, magnetic field, which is detectable by the magnetic field intensity-detecting sensors 207–215 of FIGS. 7, 8, *8b*. and *8c*. but, which is not strong enough to overwhelm them. In the present embodiment, the sensors 207–215 are of the magnetic flux gate variety, and are used because of their high degree or sensitivity to changes occurring in magnetic fields. This does not exclude other types of magnetic field-detecting sensors from being used in the present embodiment. In the present embodiment, each electromagnet supplies a continuous, uniform, low-intensity, magnetic field to a group of 3 magnetic flux gate sensors. The sensors 209, 211 and 213 are affected by the slightly overlapping, magnetic fields emanating from electromagnets 217 and 218. This overlapping effect is illustrated in FIG. 8*c*., in which the four, overlapping areas of electromagnetic surveillance coverage in FIG. 7 are approximated. It is acknowledged that in practice, more or fewer electromagnets, and more, or fewer, magnetic flux gate sensors may be required in order to provide adequate metal-detection coverage.

The magnetic flux gate sensors 207–215 of FIGS. 7, 8, 8*b* and 8*c*. would, each independently, produce analog signals, which are of a measurable and consistent intensity, as a consequence of their exposure to the uniform, unfluctuating, magnetic fields, emanating from the electromagnets. The analog signals from each magnetic flux gate sensor are separately input to digitizer 116 via multi-conductors 72 and, are inputted to computer 22 via multi-conductors 220 for interpretation and response. These signals are individually inputted to, monitored by, and analyzed by, computer 22 for variations in signal intensity. The computer is programmed to identify each magnetic flux gate sensor with respect to its positional relationship within its group of 3 sensors and, with respect to its positional relationships, with the other magnetic flux gate sensors within the housing 206.

The computer 22 is programmed to monitor, quantify and record the data, representing the baseline intensities of the signals, which are being output by each of the individual, magnetic flux gate sensors consequent to their exposure to the unfluctuating, magnetic fields radiating from the electromagnets 216–219. These signals represent the baseline, electromagnetic field intensities, which register, when no metal objects are present between housings 204 and 206 of FIG. 7. When the system is turned on, the computer is programmed to obtain and store in memory the data representing the individual, baseline, electromagnetic field intensity detected by each magnetic flux gate sensor. The computer is programmed to utilize these baseline data as references during its monitoring of the individual magnetic flux gate sensor inputs, in anticipation of the presence of metal objects between housings 204 and 206. The computer is programmed to continually compare each magnetic flux gate sensor's current reading to its respective baseline reading at an arbitrary rate of, e.g., 10 times per second. During such comparisons, the computer is programmed to monitor for any changes, which may occur in the intensities of the detected, electromagnetic fields, at one or more of the magnetic flux gate sensors. When no metal objects are detected passing through the MOD sensor unit 36 each magnetic flux gate sensor's current reading will equal, or approximately equal its respective baseline reading.

When a metal object enters the area of the magnetic fields between housings 204 and 206, FIG. 7, its reluctance causes a change in the intensity of the magnetic field or, in the overlapping magnetic fields, present within that area. Such changes in intensity are detected by computer 22 at one or more of the positionally-identified, magnetic flux gate sensors. The computer interprets the detection of such changes in intensity as representing the presence of at least one metal object between housings 204 and 206. The larger the changes in intensity the greater the mass of the detected metallic object. Furthermore, the computer is programmed to establish a position for at least one detected metal object within the magnetic fields. The computer's calculation of the position of a detected metal object is based on its programmed interpretation of the detected differences in the intensities of the electromagnetic fields of the individual, responding, magnetic flux gate sensors. The computer's calculation of the position of a detected metal object is also based on its interpretation of the variances, occurring between the responding, magnetic flux gate sensors, within a group of 3 such sensors and, between the responding sensors within the different groups of such sensors.

The reference values to be used by the computer in making such object-position determinations may be obtained by empirical means during the completion of the computer's programming prior to the system's installation in a host facility for purposes of illustrating a method for obtaining the above-cited reference values, the area between housings 204 and 206 has been subdivided into grids, which are numbered 230–265. During the process of obtaining these reference data, firearms, and other arms, of various sizes and shapes, as well as other, smaller and larger, metallic objects, are methodically, laterally, introduced one at a time into the area between housings 204 and 206 in a manner which will simulate the spectrum of possible locations for each such object. The computer is programmed to register and store the reference data, as they are produced, consequent to the sequential insertion of each new, object-to-be-detected into the various grid areas. The computer is programmed to allow data pertaining to the type, mass and dimensions of each new, object-to-be-detected, to be entered, prior to that object's insertion into the various grid areas and, is programmed to link this entered information to the data, which will be obtained for that object when it is physically inserted into the various grid areas.

One possible method for the insertion of each object-to-be-detected into the various grid areas is cited, as follows. The mass and dimensions of the first object-to-be-detected is entered into computer 22. That object is laterally inserted into grid area 230. The responding magnetic flux gate sensors input a series of incremental signals to digitizer 116 via multi-conductors 72 and onward to computer 22 via multi-conductors 220. These signals occur in response to the object as it is incrementally inserted through grid area 230. This process is sequentially repeated for grid areas 231–265. The actual dimensions of the individual grid areas, which are used in this manner, should approximate the dimensions of the object-to-be-detected. The computer is programmed to link the data thus obtained to the object's type, mass and dimensions data, and is programmed to compile these data in database 62. The data thus obtained, will represent each object's type classification, mass, and dimensions, in relation to its proximity to the responding sensors at varying distances from those sensors. This process is repeated for all subsequently inserted, metallic objects until an effective database is compiled. These data are accessed by computer 22 via conductors 154 and are used by the computer as references, for comparison, with a detected metal object's data, during the system's monitoring of a host facility's entryways. Whenever one or more metal objects are detected, the computer is programmed to compare the data being input from the responding, magnetic flux gate sensors to the reference data cited above. The computer is programmed to utilize the Artificial Intelligence and/or Fuzzy Logic algorithms 66, FIG. 4 in categorizing each detected metal object from the standpoint of whether or not, it is a potential weapon based on the outcome of the above-cited comparisons. The computer 22 is programmed to determine its responses to the detection of at least one metallic object of significant size and dimensions based on the outcomes of the above-cited analyses and comparisons. If the object is categorized as a potential weapon, the computer is programmed to effect the active, optical surveillance, and tracking of the person emerging from the MOD sensor unit 36, FIGS. 4 and 7, as discussed elsewhere in the present embodiment.

When armed authorities respond to the immobilization of a criminal, their own immobilization by the system must be prevented. At least one provision is made to prevent the immobilization of the responding authorities by the ATI system. The method used in the present embodiment involves the retrofitting, of the authorities' weaponry, and/or badges, with at least one transponder device, such as: the Checkpoint QS2000 System's Radio Signal Transponder, 200, FIG. 7b., which is part of a commercial, anti-shoplifting system. These devices are thin, inexpensive, and are easily installable. In the present embodiment, such transponders are installed in, or on the grips or other non-metallic portion of each of the weapons used by the authorities and/or as a part of their badges. Consequently, when the authorities respond to an immobilization event (or, when they merely enter the host facility), each of their transponders 200 returns at least one signal to the Transponder Signal Transmitter/Receiver device 202 upon entry into the host facility. The Transponder Signal Transmitter/Receiver device 202 is configured to detect the signals, which are emitted from each transponder device 200 when the responding authorities enter the host facility and, to communicate the detection of such signals to digitizer 116 via the multi-conductors 72 and then, to computer 22 via multi-conductors 220 for interpretation and response. The system's computer 22 is programmed to identify the occurrence of each of these signals and to interpret and respond to them by disabling the ATI System's targeting feature, thereby preventing the unintentional immobilization of the armed, responding authorities.

Consequently, the responding authorities would not be targeted for immobilization when entering a host facility, and their movements would not be hindered by the system. The authorities would be able to move safely within the confines of the facility with their weapons drawn. When the system detects the entry of an authorized weapon, into its host facility, after an immobilization has occurred, it effects the emission of an audible tone, or another acknowledgement signal, at the point of detection. Such signals are emitted in order to inform the legitimately armed person that their weapon has been cleared by the system. Once such a weapon is cleared by the system, the person carrying it will not be immobilized within the confines of the host facility. This weapons clearing procedure includes the optical tracking of such persons, without their being targeted for immobilization. Additional precautions are to be programmed into the system, which will ensure that the computer does not respond to the mere presence of a weapons image within a given image frame, but rather, responds only to such a presence when the person associated therewith is being actively targeted, and tracked. This will help prevent the unintentional immobilization of friendly forces, while maintaining security against unauthorized, armed intruders.

In order to achieve full security coverage within a host facility, the system's variously stationed, surveillance imaging means (SIM units, 34) should be deployed within that facility in a manner which will permit full, intersecting, line-of-sight, multi-perspective, stereoscopic, coverage for all relevant areas within that facility. The computer 22 is programmed to switch from at least one SIM unit 34 to at least one other separate SIM unit 34 during the system's surveillance of each potentially armed person, as that person moves within the confines of the facility. The computer is also programmed to simultaneously analyze and respond to the image data being input from two or more SIM units 34 which are jointly involved in such active surveillance. The system's various Armed Threat Response Mechanisms (ATRM's) must likewise be deployed within the host facility in a manner which will permit full, defensive, intersecting, line-of-sight coverage for all relevant areas which are surveilled by the system's SIM units 34. The system is configured to utilize as many SIM and ATRM units as are required to provide full security coverage to all surveilled areas within the host facility, in order to ensure that there are no surveillance 'blind spots'. The computer 22 is also programmed to effect an analysis of each SIM unit's surveillance coverage area as part of the system's installation in a given facility. Computer 22 is programmed to identify blind spots in surveillance coverage, and to recommend installation sites for additional SIM and ATRM units in order to eliminate such blind spots.

Computer 22 is also programmed to monitor, diagnose, and report, all ATI System functions and operations in order to detect any hardware or software defects which would interfere with the system's safe, and effective performance and operation. Such self diagnostics include but are not limited to: the monitoring of the High Voltage Source 82 with regard to its safe functioning, and voltage output via multi-conductors 156 and 164; the monitoring of the system's projectile wiring; the determination of projectile misfirings; the reporting of projectiles remaining after each firing; the testing of servo mechanisms; etc., etc. If computer 22 finds any significant malfunction which would interfere with the operation of the system, it effects the issuance of an alert signal, which is conducted to a reporting mechanism, such as an LCD screen, or printer, etc., in order that the discovered deficiency can be corrected. The computer 22 then, effects the disabling of the system, if any defect which would interfere with the system's safe and effective performance and operation is detected. All non-significant diagnostic findings are reported in a similar manner, except that the system is not disabled.

In a second preferred embodiment, the computer 22 of the first embodiment is configured and programmed to permit the surveillance and decision-making functions to be placed into the hands of a human operator such as, a security guard. In such a hybrid system, the human operator would be able to view the surveillance images, being input to the computer 22 from at least one SIM unit 34 of FIG. 4 in real-time, on a television, or computer monitor. The system is configured and programmed to allow the human operator to control the tracking movements of at least one SIM unit 34 during the active surveillance of at least one potentially armed person. The system is configured and programmed to allow the human operator to effect the system's targeting of such a person for possible immobilization and, to effect the discharging of immobilizing projectile pairs from at least one, proximate ATRM unit in response to the occurrence of a terrorist assault or, an armed robbery attempt. As in the first embodiment, the system will summon local authorities, when an immobilization has occurred. Thus, the decision of whether or not, to fire the immobilizing projectiles would be made by a remotely located, human operator, according to the circumstances and conditions occurring at the crime scene.

In a third preferred embodiment, the MSU unit 40 of FIGS. 1 and 4 of the first embodiment, would be aimed at a specific surveillance area and would be activated by the person stationed within the protected area via the actuation of a locally installed, manually controlled panic button 74, FIG. 4, only when an armed threat condition actually occurs. The system's computer is configured and programmed to respond to the activation of the panic button by immediately analyzing the most current surveillance image for the presence of pre-aggressive movements, posturing, and/or gesturing, in combination with the presence of a weapons image. When such a system configuration is activated, the system, being programmed to recognize and respond to armed threat conditions, will analyze the surveillance images of at least one person, who is standing in a predesignated area of surveillance and, will assign target coordinates to such a person. If pre-aggressive movements, posturing, and/or gesturing, in combination with the presence of at least one weapon image, is detected, within the image frames of such persons, this system configuration would effect their immediate immobilization. Such a configuration is not ideal, since the activation of the system probably would not precede the perpetrator's drawing and aiming of the weapon, whereas, in the fully automated system, the weapon would only be partially drawn, when immobilization of the perpetrator takes place.

Figure 5:
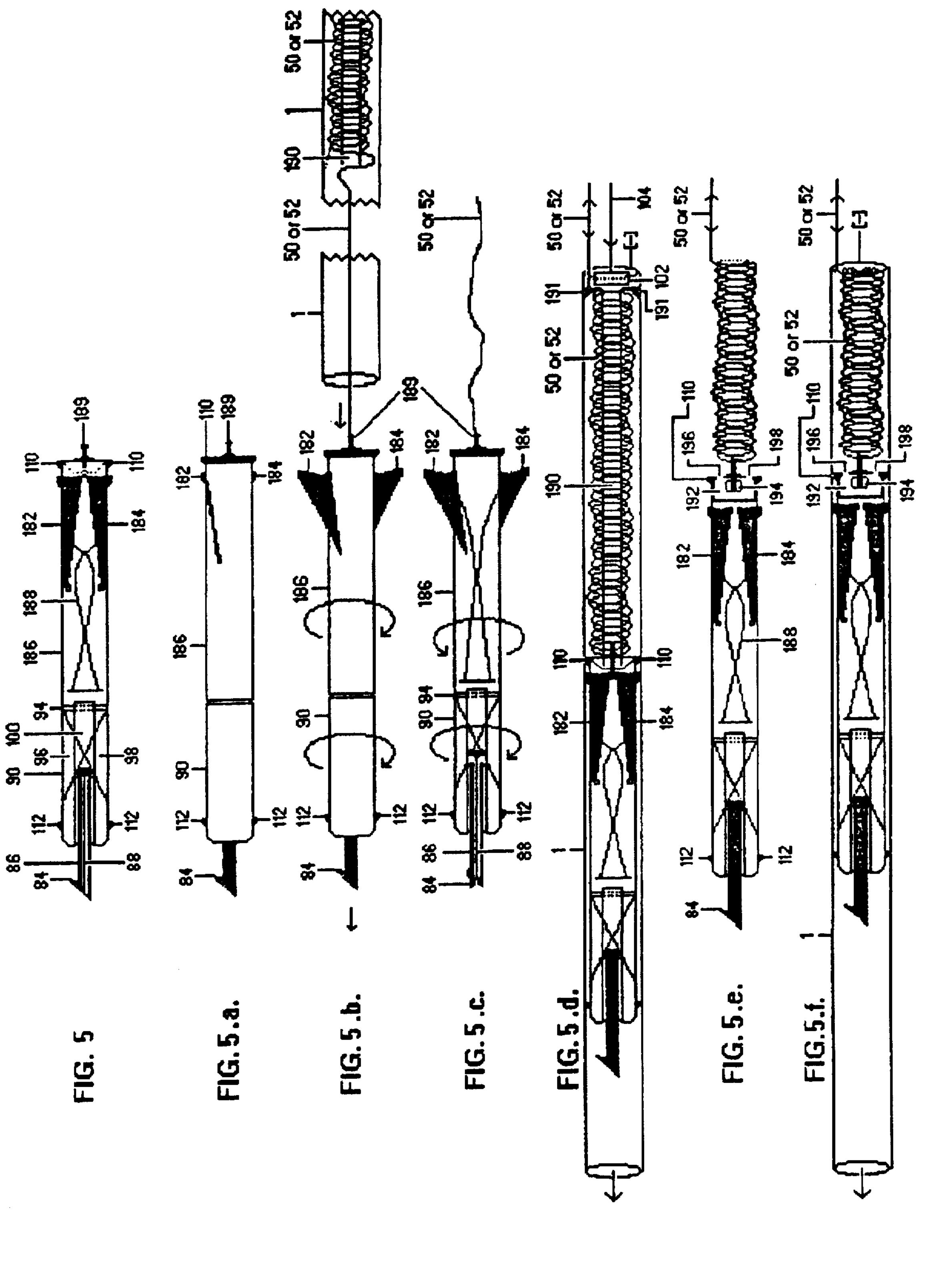
FIG. 5 illustrates a cross-sectional transparency of an alternate configuration of the immobilizing projectile of FIGS. 2–2*d*.

In a fourth preferred embodiment, of the present invention, the projectiles of FIGS. 5–6*d*. would be substituted for those of FIGS. 2–2*d*., of the first embodiment. The ATRM 70 of FIG. 6 of the fourth embodiment, would contain the projectiles of FIGS. 5–5*d*. and would be substituted for the ATRM's 38 of FIGS. 1, and 4, the ATRM 46 of FIG. 4 and the ATRM, 68 of FIG. 1*a*. of the first embodiment. The illustrations of the firing of projectile pairs in FIGS. 1*a*., and 4 of the first embodiment, are the same as those for the firing of projectile pairs, in the fourth embodiment, and are given the same numeral designations 54 and 56 in the fourth embodiment. The ATRM units of the second embodiment are negatively grounded.

FIG. 5 illustrates a cross-sectional transparency of an alternate configuration of the immobilizing projectiles of FIGS. 2–2*d* in a pre-fired state. This projectile configuration is used in a fourth embodiment of the present invention. FIG. 5 shows an extended, retractable barb 84 and two extendable, angular fins 182 and 184, which are retracted into the projectile's rear body section 186 under spring tension from the fin extender springs 188 when the projectile is loaded into a launching tube 1, FIG. 5*d*. The projectile is attached to the system by its tethering conductors 60 or 52 at protrusion 189.

FIG. 5*a*. illustrates an external view of the immobilizing projectile of FIG. 5 with its fins 182 and 184 retracted into its body.

FIG. 5*b*. illustrates the projectile of FIG. 6*a*. and 6*d*. exiting its launching tube 1 and trailing its tethering conductors 50 or 52, while en route to its intended target after having being fired.

FIG. 5*c*. illustrates the immobilizing projectile of FIG. 5 in its post-firing state showing the release of barb 84 from its extended position via the opposing rotation of front and rear body sections 90 and 186. The release of the barb 84, from its extended position permits the projectile's probe 86 to be pulled from the immobilized person's skin or clothing with little resistance.

FIG. 5*d*. illustrates a possible launching tube configuration for the fourth embodiment wherein the immobilizing projectile of FIG. 5 is attached to its tethering conductors 50 or 52 and, is encased within a launching tube 1. FIGS. 5*d*. and 5*b*. show the location and use of a propellant gas transfer tube 190 which delivers propellant gases from the propellant 102 to the base of the projectile during firing, in order to prevent the propellant gases from damaging the tethering conductors. The gas transfer tube seals 191 of FIG. 5*d*. prevent the propellant gases from entering the rear of the chamber where the tethering conductors 50 or 52 are stored.

In a fifth preferred embodiment of the present invention, the projectiles of FIGS. 5*e*.–5*f*. would be substituted for those of FIGS. 2–2*d*. of the first embodiment. In the fifth embodiment, each of the launching tubes of the ATRM 70 of FIG. 6 would be modified in conformity with the projectile/launching tube configuration illustrated in FIG. 5*f*. Each launching tube of each ATRM in the present embodiment would be loaded with at least one immobilizing projectile, of the type shown in FIG. 5*e*. Each ATRM in the present embodiment would be functionally substituted for the ATRM's 38 of FIGS. 1 and 4, the ATRM 46 of FIG. 4 and the ATRM 68 of FIG. 1*a*. of the first embodiment. The illustrations of the firing of projectile pairs in FIGS. 1*a*. and 4, of the first embodiment are the same as those for the firing of projectile pairs in the fifth embodiment, and are given the same numeral designations 54 and 56, in the third embodiment. The ATRM units of the fifth embodiment are negatively grounded.

FIG. 5*e*. illustrates an alternate means for propelling the immobilizing projectile of FIG. 5. The projectile of FIG. 5*e*. has a miniaturized, solid fuel, propulsion device built into its base. This device is comprised of the following: a small quantity of solid fuel propellant 192 sufficient to propel the projectile to its intended target; a propellant igniter, 194 attached to the tethering conductors 50 or 52; and, several angularly vented, propellant gas exhaust ports 196 and 198. The projectile of FIG. 5*e*. also has an extended, retractable barb, 84 and two extendable, angular fins 182 and 184, which are retracted into the projectile's rear body section 186 under spring tension from the fin extender springs 188 when the projectile is loaded into a launching tube 1, FIG. 5*f*.

FIG. 5*f*. illustrates the projectile of FIG. 5*e*. encased in its launching tube 1 in a ready-to-fire condition. In FIGS. 5*e*.–*f*., the projectiles 54 and 56 of each projectile pair are wired with conductors 50 and 52, respectively, for use in igniting each projectile's propellant 21 during their tandem firing and, for carrying doses of high voltage current once those projectiles are fired. The propellant ignitor 194 of FIGS. 5*e*.–*f*. requires a stronger current to effect its ignition than the current which is used to test the electrical resistance of the tethering conductors 50 or 52. In FIGS. 5*e* and *f*, the propellant 192 is contained in the rear of the projectile's body and is ignited by igniter 194 via an electrical current of sufficient magnitude, which is passed through conductors 50 or 52. Gases from the ignited propellant 192 are vented toward the rear of the launching tube via exhaust ports 196 and 198, thereby driving the projectile forward and out of the launching tube 1. This projectile's spin is enhanced by the angularly venting of the propellant's exhaust gases, thereby imparting additional rotation to the projectile's body during flight.

In a sixth, preferred embodiment of the present invention, the immobilizing projectiles are designed and configured, to allow two projectiles of each projectile pair to be simultaneously fired from one launching tube. The projectiles of such a projectile pair are designed to enable them to be loaded, one in front of the other, within each ATRM launching tube. The projectiles of each projectile pair, in this embodiment, are aerodynamically designed, to separate sufficiently during flight prior to striking their intended target.

In a seventh preferred embodiment of the present invention, a singular projectile itself is redesigned to separate into two projectiles, which function as a projectile pair after firing occurs. This is accomplished by halving a projectile of FIG. 2*a*. on its longitudinal axis, and equipping each half with its own set of fins, its own barbed probe, and its own length of tethering conductors. The projectiles of each projectile pair of this embodiment, are aerodynamically designed so the two halves will separate sufficiently during flight prior to striking their intended target. The advantages of such an arrangement include: an increase in the fire power of each ATRM unit.

In an eighth preferred embodiment of the present invention, the laser 78 which is housed within tubes 6 of FIGS. 1, 1*a*., 3, 4, 4*a*. and 6, is used by the system as an alternate targeting device, whereby its beam acts as a focal point, for use in optical: target acquisition prior to the firing of the immobilizing projectiles. The firing of Laser 78 is controlled by computer 22 using the ATRM Firing Controller 80 via multi-function conductors 156 and 158.

In a ninth preferred embodiment of the present invention, the system of the first embodiment would include the following feature. The height of the person, on whom a potential weapon is detected is approximated using a vertical array of photocells. The photo-emitters are mounted in housing 204 and, their respective photocells are mounted in opposing positions in housing 206 of FIG. 7. The value representing the height of each photocell from the floor is programmed into computer 22. The signals from these photocells are individually input to computer 22 for interpretation. The highest-mounted photocell, which is not disrupted when someone walks through the entryway, represents the approximate height of that person. When the computer detects the presence of at least one potential weapon, it is programmed to correlate the position of the weapon within the metal-detecting area to the height of the person on whom the metal object was detected. The computer is programmed to then determine the weapon's location on the body of the person on whom it was detected, e.g. ankle, calf, waist, chest, hat, etc., and to produce a read-out disclosing its location.

In a tenth preferred embodiment of the present invention, the system of the first embodiment would include the use of an auxiliary source of electrical power, which enables the system to continue to operate in the event that its external source of electricity is disrupted. The system's computer is configured and programmed to detect the loss of external, electrical power, and to respond thereto by switching the system to its auxiliary power supply. The system's computer is further programmed to effect telephone communication with the local authorities, a security service, etc., therein stating that there is a power disruption, and that there may be an attempted breach of security in progress. The computer is programmed to monitor the power level, of the auxiliary power supply, and to maintain the system's normal operation, until the external power is restored or, until the auxiliary power supply is exhausted.

It is acknowledged that additional projectile variations are possible including the use of untethered, self-contained immobilizing projectiles, each of which, would carry its own electronic means for delivering a stroke of immobilizing current on impact with its target. The use of such projectiles is not to be excluded from application in the present invention, and falls within its scope, and intent. Also, the use of non-electrical, immobilizing projectiles such as hypodermic darts carrying one or more rapidly acting, immobilizing drugs, is not to be excluded from application in the present invention, and falls within its scope, and intent.

It is also acknowledged that other means for the system to clear authorized weapons, such as, the use of thin, detectable, encoded magnetic strips attached to such weapons in conjunction with a magnetic means for detecting such encoding, could be used to replace the transponder detection means cited in the present invention, and that such usage is intended to be included in the scope and intent of the present invention.

I claim:

1. A surveillance system for detecting the presence of one or more human beings carrying one or more weapon objects within the confines of a designated area of surveillance, comprising, metal sensing means for detecting the presence of a weapon object carried by one or more of the human beings within the area of surveillance, at least one optical imaging means adapted to produce data representing successive image frames arranged for optically tracking, in frame by frame, sequence the one or more human beings on whom the one or more weapon objects have been detected, and computer means connected to said metal sensing means and said imaging means and having program means for effecting the initial detection of the one or more weapon objects by said metal sensing means, and for enabling said imaging means to track the movement of the one or more human beings carrying the weapons objects within the area of surveillance.

2. The surveillance system as defined in claim 1 wherein said computer means is arranged for controlling said imaging means to analyze, frame by frame, the data representing the movements and postures of the one or more human beings.

3. The surveillance system as defined in claim 1 including immobilizing means having one or more projectile devices adapted to be propelled against the one or more human beings for immobilizing the same when said immobilizing means is activated, said immobilizing means being connected to said computer means for activation thereby upon a predetermined command signal.

4. The surveillance system as defined in claim 1 wherein said computer means includes means for assigning target coordinates to the one or more human beings as they move about within the area of surveillance.

5. The surveillance system as defined in claim 4 wherein said means for assigning target coordinates is adapted to update said target coordinates as the one or more human beings move within the area of surveillance.

6. The surveillance system as defined in claim 1 wherein said computer means includes analyzing means being programmed to establish comparison between data representing analyzed images stored therein to the one or more human beings under surveillance.

7. The surveillance system as defined in claim 1 wherein said computer means includes at least one database having data representing a variety of image models which characterize the spectrum of human pre-aggressive movements, postures and gestures.

8. The surveillance system as defined in claim 7 wherein said database includes image models which characterize the spectrum of hand-carried weapon objects.

9. The surveillance system as defined in claim 1 wherein said computer program means is adapted to summon law enforcement assistance and to effect the logging and preservation of the video record of said detection and tracking of the one or more human being carrying weapon objects.

10. The surveillance system as defined in claim 3 wherein said program means is arranged for determining the medically physical condition of the one or more human beings to which said projectile device has been propelled, and to summon medical assistance therefor if needed.

11. The surveillance system as defined in claim 3 wherein said program means is arranged to monitor said immobilized human being for movement indicative of a renewed threat and/or flight to avoid capture.

12. A surveillance system for detecting the presence of one or more human beings carrying one or more weapon objects within the confines of a designated area of surveillance, comprising, metal sensing means for detecting the presence of a weapon object carried by one or more human beings within the area of surveillance, an optical imaging means adapted to produce data representing successive image frames arranged for optically tracking, in frame by frame, sequence the one or more human beings on whom the one or more weapon objects have been detected, and computer means connected to said metal sensing means and said imaging means and having program means devised for designating the one or more human beings carrying weapon objects as targeted individual(s), and to track the movement of said targeted individual within the area of surveillance, said program means being arranged to distinguish said targeted individual (s) from non-targeted individual(s) and inanimate objects.

13. The surveillance system as defined in claim 12 wherein said non-targeted individual(s) and inanimate objects include law enforcement person(s) and their weapon (s).

14. The surveillance system as defined in claim 12 wherein said computer means is arranged for controlling said imaging means to analyze, frame by frame, the data representing the movements and postures of said targeted individual(s).

15. The surveillance system as defined in claim 12 including immobilizing means having one or more projectile devices adapted to be propelled against said targeted individual(s) for immobilizing the same when said immobilizing means is activated, said immobilizing means being connected to said computer means for activation thereby upon a predetermined command signal.

16. The surveillance system as defined in claim 12 wherein said computer means includes means for assigning target coordinates to said targeted individual(s) as they move about within the area of surveillance.

17. The surveillance system as defined in claim 16 wherein said means for assigning target coordinates is adapted to update said target coordinates as said targeted individual(s) move about within the area of surveillance.

18. The surveillance system as defined in claim 12 wherein said computer means includes analyzing means being programmed to establish comparison between data representing analyzed images stored therein to data representing said targeted individual(s) under surveillance.

19. The surveillance system as defined in claim 18 wherein said computer means being programmed to distinguish between non-aggressive and pre-aggressive movements, postures and gestures of the one or more human beings and to detect the appearance and movements of weapon objects during said image frame analysis.

* * * * *

UNITED STATES PATENT AND TRADEMARK OFFICE

CERTIFICATE OF CORRECTION

PATENT NO. : 5,747,719

DATED : May 5, 1998

INVENTOR(S) : Bottesch

It is certified that error appears in the above-identified patent and that said Letters Patent is hereby corrected as shown below:

On the title page,

Item [57], line 19, change "tract," to -- track--.

Signed and Sealed this

Sixteenth Day of February, 1999

Attest:

Attesting Officer

*Acting Commissioner of Patents and Trademarks*